(12) United States Patent
Pan et al.

(10) Patent No.: US 11,540,342 B2
(45) Date of Patent: *Dec. 27, 2022

(54) METHOD AND APPARATUS FOR SIDELINK SIGNALING RADIO BEARER (SRB) ESTABLISHMENT IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 88 days.

This patent is subject to a terminal disclaimer.

(21) Appl. No.: 17/233,509

(22) Filed: Apr. 18, 2021

(65) Prior Publication Data

US 2021/0243827 A1 Aug. 5, 2021

Related U.S. Application Data

(63) Continuation of application No. 17/097,681, filed on Nov. 13, 2020, now Pat. No. 11,019,670.
(Continued)

(51) Int. Cl.
*H04W 76/14* (2018.01)
*H04W 4/40* (2018.01)
(Continued)

(52) U.S. Cl.
CPC .......... *H04W 76/14* (2018.02); *H04W 4/40* (2018.02); *H04W 76/27* (2018.02); *H04W 80/02* (2013.01); *H04W 92/18* (2013.01)

(58) Field of Classification Search
CPC .... H04L 61/00; H04L 69/14; H04W 4/40–48; H04W 8/26; H04W 12/037;
(Continued)

(56) References Cited

U.S. PATENT DOCUMENTS

2020/0077253 A1* 3/2020 Kim ...................... H04W 76/30
2020/0118445 A1* 4/2020 Kim ...................... H04W 4/46
(Continued)

OTHER PUBLICATIONS

Ran2, "LS Response to SA2 on Unicast, Groupcast and Broadcast in NR Sidelink," 3GPP TSG-RAN WG2 Meeting #105, Athens, Greece, Feb. 25-Mar. 1, 2019, R2-1902494/S2-01902957, pp. 1-2 (Year: 2019).*

(Continued)

*Primary Examiner* — Thomas R Cairns
(74) *Attorney, Agent, or Firm* — Skaar Ulbrich Macari, P.A.

(57) ABSTRACT

A method and apparatus are disclosed. A first sidelink Signaling Radio Bearer (SRB) for PC5-S message transmission is established. The first sidelink SRB is associated with a default Destination Layer-2 Identity (ID). A first PC5-S message is transmitted on the first sidelink SRB with a Source Layer-2 ID derived from a Layer-2 ID of the first UE and a Destination Layer-2 ID derived from the default Destination Layer-2 ID. A second PC5-S message is received from a second UE. The second PC5-S message is transmitted with a Source Layer-2 ID derived from a Layer-2 ID of the second UE and a Destination Layer-2 ID derived from the Layer-2 ID of the first UE. A second sidelink SRB for PC5-S message reception and/or transmission is established. The second sidelink SRB is associated with the Layer-2 ID of the second UE.

20 Claims, 13 Drawing Sheets

Related U.S. Application Data

(60) Provisional application No. 62/940,460, filed on Nov. 26, 2019.

(51) Int. Cl.
*H04W 76/27* (2018.01)
*H04W 80/02* (2009.01)
*H04W 92/18* (2009.01)

(58) Field of Classification Search
CPC ... H04W 28/0252–0263; H04W 52/02; H04W 76/10–16; H04W 76/27; H04W 80/02; H04W 92/18
See application file for complete search history.

(56) References Cited

U.S. PATENT DOCUMENTS

| | | | |
|---|---|---|---|
| 2020/0229249 A1* | 7/2020 | Cheng | H04W 76/27 |
| 2020/0245394 A1* | 7/2020 | Wu | H04W 76/11 |
| 2020/0260512 A1* | 8/2020 | Cheng | H04W 76/23 |
| 2020/0267799 A1* | 8/2020 | Lee | H04W 76/34 |
| 2020/0314928 A1* | 10/2020 | Kang | H04W 76/27 |
| 2020/0323019 A1* | 10/2020 | Vargas | H04B 1/0064 |
| 2020/0341966 A1* | 10/2020 | Stoecklin | G06F 16/23 |
| 2020/0344636 A1* | 10/2020 | Lee | H04W 80/02 |
| 2020/0351959 A1* | 11/2020 | Lee | H04L 1/1819 |

OTHER PUBLICATIONS

Huawei, HiSilicon, "TP to TR 38.885 on QoS Support for NR V2X," 3GPP TSG-RAN WG2 Meeting #105, Athens, Greece, Feb. 25-Mar. 1, 2019, R2-1902500, pp. 1-8 (Year: 2019).*

* cited by examiner

METHOD AND APPARATUS FOR SIDELINK SIGNALING RADIO BEARER (SRB) ESTABLISHMENT IN A WIRELESS COMMUNICATION SYSTEM

CROSS-REFERENCE TO RELATED APPLICATIONS

The present application is a Continuation of U.S. patent application Ser. No. 17/097,681, filed Nov. 13, 2020, which claims priority to and the benefit of U.S. Provisional Patent Application Ser. No. 62/940,460, filed Nov. 26, 2019; with the entire disclosures of each referenced patent application fully incorporated herein by reference.

FIELD

This disclosure generally relates to wireless communication networks, and more particularly, to a method and apparatus for sidelink SRB establishment in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first User Equipment (UE) for establishing a unicast link. In one embodiment, the method includes the first UE establishing a first sidelink Signaling Radio Bearer (SRB) for PC5-S message transmission if a unicast link or a PC5-Radio Resource Control (PC5-RRC) connection establishment is initiated, wherein the first sidelink SRB is associated with a default Destination Layer-2 Identity (ID). The method also includes the first UE transmitting a first PC5-S message for the unicast link or the PC5-RRC connection establishment on the first sidelink SRB with a Source Layer-2 ID derived from a Layer-2 ID of the first UE and a Destination Layer-2 ID derived from the default Destination Layer-2 ID. The method further includes the first UE receiving a second PC5-S message from a second UE, wherein the second PC5-S message is transmitted with a Source Layer-2 ID derived from a Layer-2 ID of the second UE and a Destination Layer-2 ID derived from the Layer-2 ID of the first UE. In addition, the method includes the first UE establishing a second sidelink SRB for PC5-S message reception and/or transmission, wherein the second sidelink SRB is associated with the Layer-2 ID of the second UE. Furthermore, the method includes the first UE establishing a third sidelink SRB for PC5-RRC message transmission if the unicast link or the PC5-RRC connection establishment has been successfully completed, wherein the third sidelink SRB is associated with the Layer-2 ID of the second UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 23.287 V16.0.0, "Architecture enhancements for 5G System (5GS) to support Vehicle-to-Everything (V2X) services (Release 16)"; TS 33.303 V15.0.0, "Proximity-based Services (ProSe); Security aspects (Release 15); R2-1915983, "Running CR to TS 38.331 for 5G V2X with NR Sidelink", Huawei, HiSilicon; R2-1916120, "Running CR to TS 38.321 for 5G V2X with NR Sidelink", LG Electronics; and R2-1916288, "Report from session on LTE V2X and NR V2X", Samsung.

The standards and documents listed above are hereby expressly incorporated by reference in their entirety.

Figure 1:
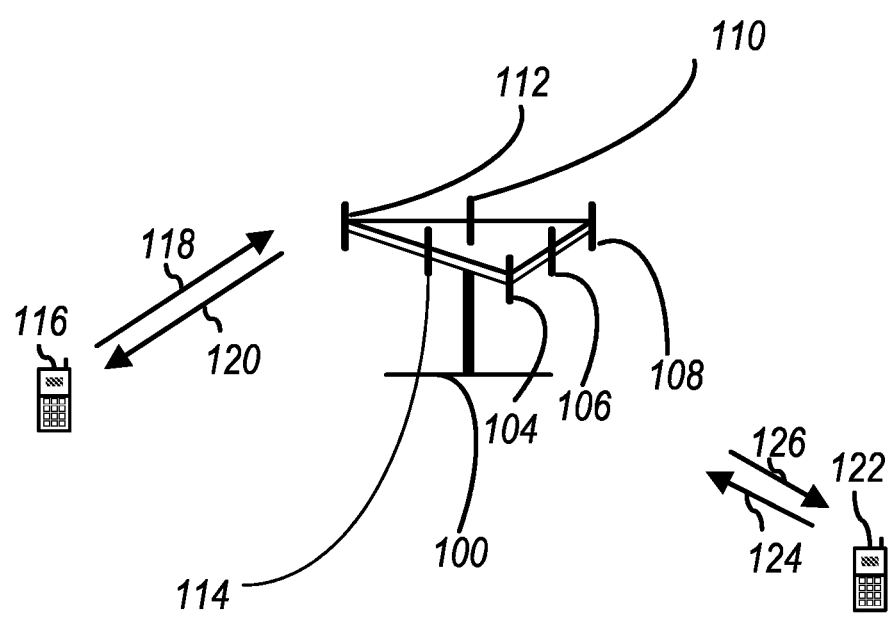
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
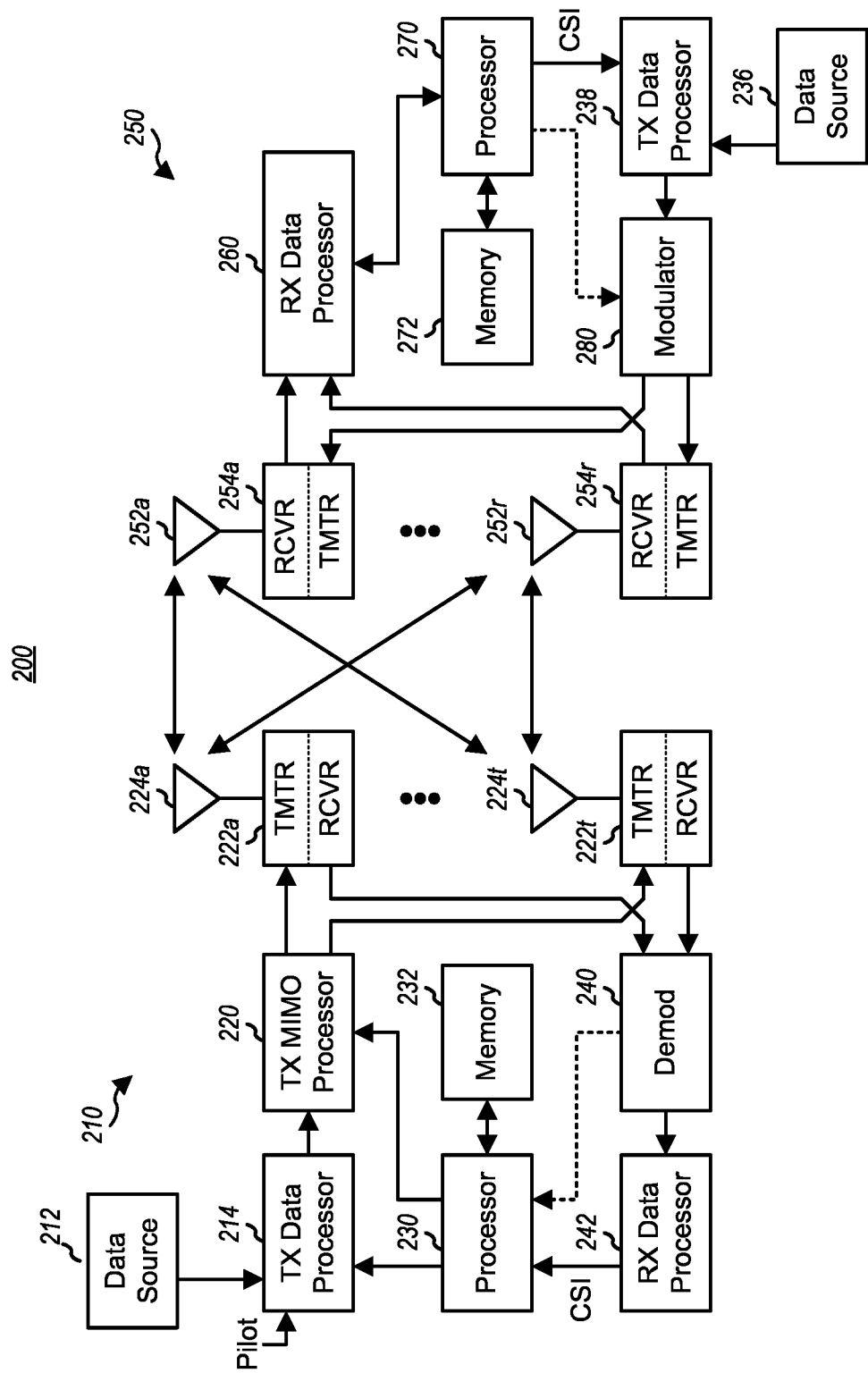
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
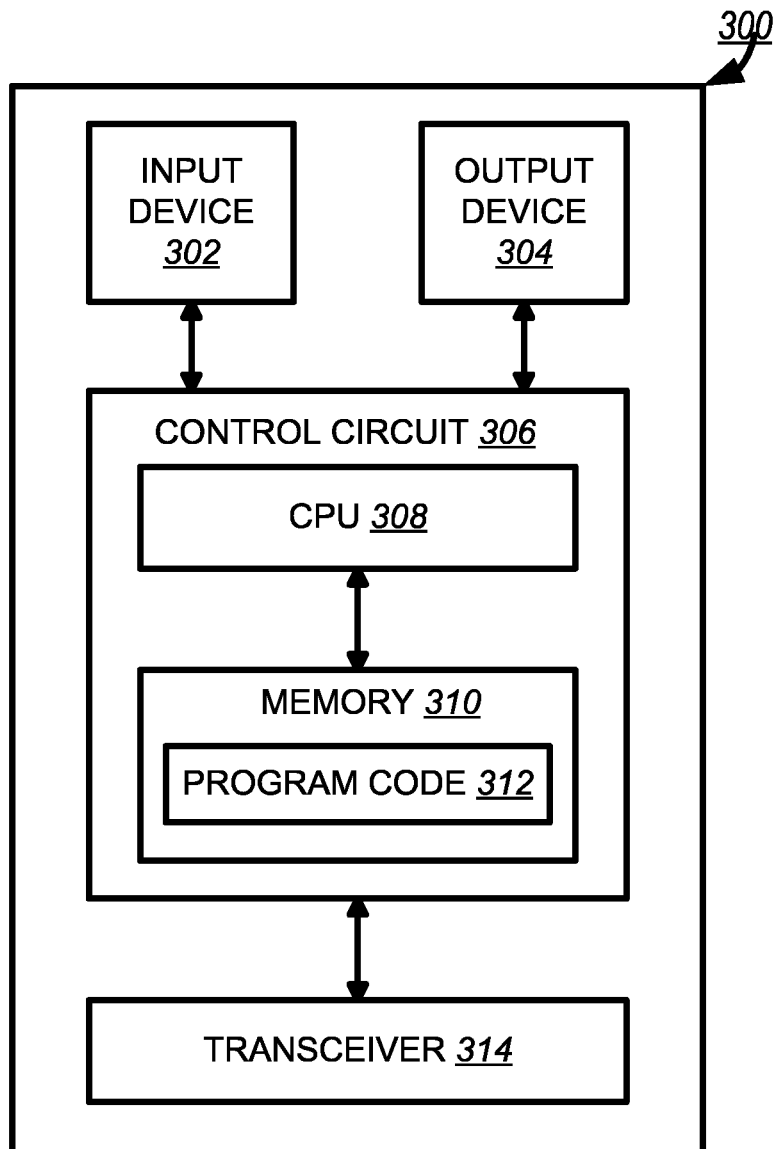
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
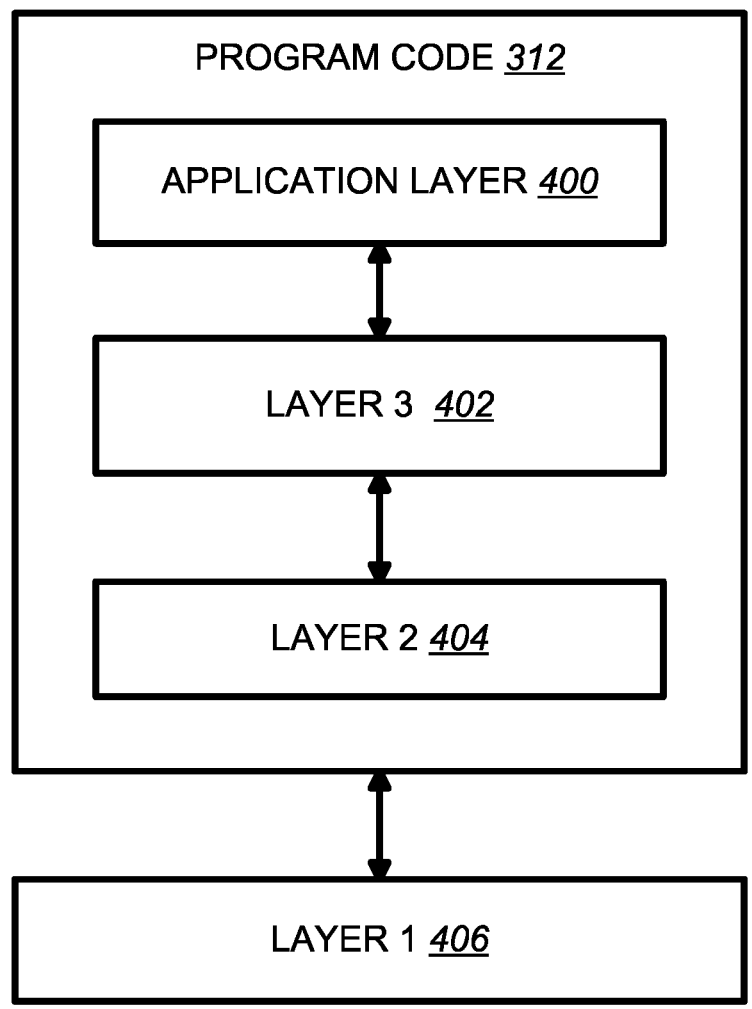
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.287 specifies Vehicle-to-Everything (V2X) communication related to unicast mode as follows:

5.1.2 Authorization and Provisioning for V2X Communications Over PC5 Reference Point 5.1.2.1 Policy/Parameter Provisioning The following information for V2X communications over PC5 reference point is provisioned to the UE:

1) Authorization policy:
   When the UE is "served by E-UTRA" or "served by NR":
      PLMNs in which the UE is authorized to perform V2X communications over PC5 reference point when "served by E-UTRA" or "served by NR".
      For each above PLMN:
         RAT(s) over which the UE is authorized to perform V2X communications over PC5 reference point.
   When the UE is "not served by E-UTRA" and "not served by NR":
      Indicates whether the UE is authorized to perform V2X communications over PC5 reference point when "not served by E-UTRA" and "not served by NR".
      RAT(s) over which the UE is authorized to perform V2X communications over PC5 reference point.

2) Radio parameters when the UE is "not served by E-UTRA" and "not served by NR":
   Includes the radio parameters per PC5 RAT (i.e. LTE PC5, NR PC5) with Geographical Area(s) and an indication of whether they are "operator managed" or "non-operator managed". The UE uses the radio parameters to perform V2X communications over PC5 reference point when "not served by E-UTRA" and "not served by NR" only if the UE can reliably locate itself in the corresponding Geographical Area. Otherwise, the UE is not authorized to transmit.

Editor's note: The radio parameters (e.g. frequency bands) are to be defined by RAN WGs. The reference to RAN specification will be added when defined in RAN WGs.

NOTE 1: Whether a frequency band is "operator managed" or "non-operator managed" in a given Geographical Area is defined by local regulations.

3) Policy/parameters per RAT for PC5 Tx Profile selection:
   The mapping of service types (e.g. PSIDs or ITS-AIDS) to Tx Profiles.

Editor's note: The Tx Profiles are to be defined by RAN WGs. The reference to RAN specification will be added when defined in RAN WGs.

4) Policy/parameters related to privacy:
   The list of V2X services, e.g. PSIDs or ITS-AIDS of the V2X applications, with Geographical Area(s) that require privacy support.

5) Policy/parameters when LTE PC5 is selected:
   Same as specified in TS 23.285 [8] clause 4.4.1.1.2 item 3) Policy/parameters except for the mapping of service types to Tx Profiles and the list of V2X services with Geographical Area(s) that require privacy support.

6) Policy/parameters when NR PC5 is selected:
   The mapping of service types (e.g. PSIDs or ITS-AIDS) to V2X frequencies with Geographical Area(s).
   The mapping of Destination Layer-2 ID(s) and the V2X services, e.g. PSIDs or ITS-AIDS of the V2X application for broadcast.
   The mapping of Destination Layer-2 ID(s) and the V2X services, e.g. PSIDs or ITS-AIDS of the V2X application for groupcast.
   The mapping of default Destination Layer-2 ID(s) for initial signalling to establish unicast connection and the V2X services, e.g. PSIDs or ITS-AIDS of the V2X application.

NOTE 2: The same default Destination Layer-2 ID for unicast initial signalling can be mapped to more than one V2X services. In the case where different V2X services are mapped to distinct default Destination Layer-2 IDs, when the UE intends to establish a single unicast link that can be used for more than one V2X services, the UE can select any of the default Destination Layer-2 IDs to use for the initial signalling.

PC5 QoS mapping configuration:
   Input from V2X application layer:
      V2X service (e.g. PSID or ITS-AID).
      (Optional) V2X Application Requirements for the V2X service, e.g. priority requirement, reliability requirement, delay requirement, range requirement.

NOTE 3: Details of V2X Application Requirements for the V2X service is up to implementation and out of scope of this specification.

Output:
   PC5 QoS parameters defined in clause 5.4.2 (i.e. PQI and conditionally other parameters such as MFBR/GFBR, etc).

SLRB configurations, i.e. the mapping of PC5 QoS profile(s) to SLRB(s), when the UE is "not served by E-UTRA" and "not served by NR".
   The PC5 QoS profile contains PC5 QoS parameters described in clause 5.4.2, and value for the QoS characteristics regarding Priority Level, Averaging Window, Maximum Data Burst Volume if default value is not used as defined in Table 5.4.4-1.

Editor's note: The SLRB configurations will be determined by RAN WGs. The reference to RAN specification will be added when defined in RAN WGs.

Editor's note: For the PC5 QoS profile, coordination with RAN WGs is needed.

Editor's note: The V2X frequencies with Geographical Area(s) will be determined by RAN WGs. The reference to RAN specification will be added when defined in RAN WGs.

5.2.1.4 Unicast Mode Communication Over PC5 Reference Point

Figure 5:
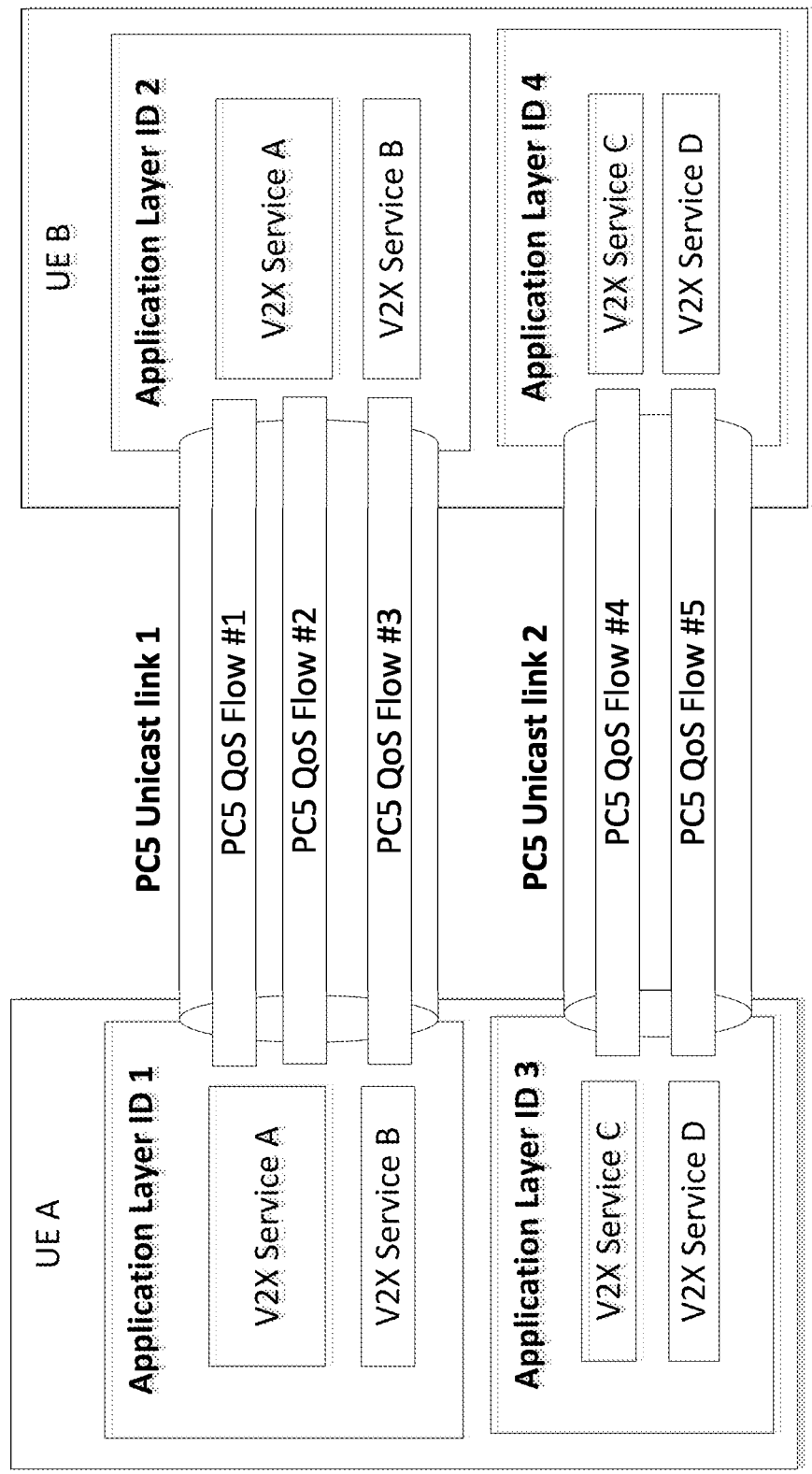
FIG. 5 is a reproduction of FIG. 5.2.1.4-1 of 3GPP TS 23.287 V16.0.0.

Unicast mode of communication is only supported over NR based PC5 reference point. FIG. 5.2.1.4-1 illustrates an example of PC5 unicast links.

[FIG. 5.2.1.4-1 of 3GPP TS 23.287 V16.0.0, entitled "Example of PC5 Unicast Links", is reproduced as FIG. 5]

The following principles apply when the V2X communication is carried over PC5 unicast link:

A PC5 unicast link between two UEs allows V2X communication between one or more pairs of peer V2X services in these UEs. All V2X services in the UE using the same PC5 unicast link use the same Application Layer ID.

NOTE 1: An Application Layer ID may change in time as described in clauses 5.6.1.1 and 6.3.3.2, due to privacy. This does not cause a re-establishment of a PC5 unicast link.

One PC5 unicast link supports one or more V2X services (e.g. PSIDs or ITS-AIDS) if these V2X services are at least associated with the pair of peer Application Layer IDs for this PC5 unicast link. For example, as illustrated in FIG. 5.2.1.4-1, UE A and UE B have two PC5 unicast links, one between peer Application Layer ID 1/UE A and Application Layer ID 2/UE B and one between peer Application Layer ID 3/UE A and Application Layer ID 4/UE B.

NOTE 2: A source UE is not required to know whether different target Application Layer IDs over different PC5 unicast links belong to the same target UE.

A PC5 unicast link supports V2X communication using a single network layer protocol e.g. IP or non-IP.

A PC5 unicast link supports per-flow QoS model as specified in clause 5.4.1.

When the Application layer in the UE initiates data transfer for a V2X service which requires unicast mode of communication over PC5 reference point:

the UE shall reuse an existing PC5 unicast link if the pair of peer Application Layer IDs and the network layer protocol of this PC5 unicast link are identical to those required by the application layer in the UE for this V2X service, and modify the existing PC5 unicast link to add this V2X service as specified in clause 6.3.3.4; otherwise the UE shall trigger the establishment of a new PC5 unicast link as specified in clause 6.3.3.1.

After successful PC5 unicast link establishment, UE A and UE B use the same pair of Layer-2 IDs for subsequent PC5-S signalling message exchange and V2X service data transmission as specified in clause 5.6.1.4. The V2X layer of the transmitting UE indicates to the AS layer whether a transmission is for a PC5-S signalling message (i.e. Direct Communication Request/Accept, Link Identifier Update Request/Response, Disconnect Request/Response, Link Modification Request/Accept) or V2X service data.

For every PC5 unicast link, a UE self-assigns a distinct PC5 Link Identifier that uniquely identifies the PC5 unicast link in the UE for the lifetime of the PC5 unicast link. Each PC5 unicast link is associated with a Unicast Link Profile which includes:

service type(s) (e.g. PSID or ITS-AID), Application Layer ID and Layer-2 ID of UE A; and Application Layer ID and Layer-2 ID of UE B; and network layer protocol used on the PC5 unicast link; and for each V2X service, a set of PC5 QoS Flow Identifier(s) (PFI(s)). Each PFI is associated with QoS parameters (i.e. PQ1 and optionally Range).

For privacy reason, the Application Layer IDs and Layer-2 IDs may change as described in clauses 5.6.1.1 and 6.3.3.2 during the lifetime of the PC5 unicast link and, if so, shall be updated in the Unicast Link Profile accordingly. The UE uses PC5 Link Identifier to indicate the PC5 unicast link to V2X Application layer, therefore V2X Application layer identifies the corresponding PC5 unicast link even if there are more than one unicast link associated with one service type (e.g. the UE establishes multiple unicast links with multiple UEs for a same service type).

The Unicast Link Profile shall be updated accordingly after a Layer-2 link modification for an established PC5 unicast link as specified in clause 6.3.3.4.

5.6 Identifiers 5.6.1 Identifiers for V2X Communication Over PC5 Reference Point 5.6.1.1 General Each UE has one or more Layer-2 IDs for V2X communication over PC5 reference point, consisting of:

Source Layer-2 ID(s); and

Destination Layer-2 ID(s).

Source and destination Layer-2 IDs are included in layer-2 frames sent on the layer-2 link of the PC5 reference point identifying the layer-2 source and destination of these frames. Source Layer-2 IDs are always self-assigned by the UE originating the corresponding layer-2 frames.

The selection of the source and destination Layer-2 ID(s) by a UE depends on the communication mode of V2X communication over PC5 reference point for this layer-2 link, as described in clauses 5.6.1.2, 5.6.1.3, and 5.6.1.4. The source Layer-2 IDs may differ between different communication modes.

When IP-based V2X communication is supported, the UE configures a link local IPv6 address to be used as the source IP address, as defined in clause 4.5.3 of TS 23.303 [17]. The UE may use this IP address for V2X communication over PC5 reference point without sending Neighbour Solicitation and Neighbour Advertisement message for Duplicate Address Detection.

If the UE has an active V2X application that requires privacy support in the current Geographical Area, as identified by configuration described in clause 5.1.2.1, in order to ensure that a source UE (e.g. vehicle) cannot be tracked or identified by any other UEs (e.g. vehicles) beyond a certain short time-period required by the application, the source Layer-2 ID shall be changed over time and shall be randomized. For IP-based V2X communication over PC5 reference point, the source IP address shall also be changed over time and shall be randomized. The change of the identifiers of a source UE must be synchronized across layers used for PC5, e.g. when the Application Layer ID changes, the source Layer-2 ID and the source IP address need to be changed.

5.6.1.2 Identifiers for Broadcast Mode V2X Communication Over PC5 Reference Point For broadcast mode of V2X communication over PC5 reference point, the UE is configured with the destination Layer-2 ID(s) to be used for V2X services. The destination Layer-2 ID for a V2X communication is selected based on the configuration as described in clause 5.1.2.1.

The UE self-selects a source Layer-2 ID. The UE may use different source Layer-2 IDs for different types of PC5 reference points, i.e. LTE based PC5 and NR based PC5.

5.6.1.3 Identifiers for Groupcast Mode V2X Communication Over PC5 Reference Point For groupcast mode of V2X communication over PC5 reference point, the V2X application layer may provide group identifier information. When the group identifier information is provided by the V2X application layer, the UE converts the provided group identifier into a destination Layer-2 ID. When the group identifier information is not provided by the V2X application layer, the UE determines the destination Layer-2 ID based on configuration of the mapping between service type (e.g. PSID/ITS-AID) and Layer-2 ID, as specified in clause 5.1.2.1.

NOTE: The mechanism for converting the V2X application layer provided group identifier to the destination Layer-2 ID is defined in Stage 3.

The UE self-selects a source Layer-2 ID.

Editor's note: Further updates of the identifiers description may be required based on RAN WG feedback.

5.6.1.4 Identifiers for Unicast Mode V2X Communication Over PC5 Reference Point

For unicast mode of V2X communication over PC5 reference point, the destination Layer-2 ID used depends on the communication peer, which is discovered during the establishment of the PC5 unicast link. The initial signalling for the establishment of the PC5 unicast link may use a default destination Layer-2 ID associated with the service type (e.g. PSID/ITS-AID) configured for PC5 unicast link establishment, as specified in clause 5.1.2.1. During the PC5 unicast link establishment procedure, Layer-2 IDs are exchanged, and should be used for future communication between the two UEs, as specified in clause 6.3.3.1.

The Application Layer ID is associated with one or more V2X applications within the UE. If UE has more than one Application Layer IDs, each Application Layer ID of the same UE may be seen as different UE's Application Layer ID from the peer UE's perspective.

The UE maintains a mapping between the Application Layer IDs and the source Layer-2 IDs used for the PC5 unicast links, as the V2X application layer does not use the Layer-2 IDs. This allows the change of source Layer-2 ID without interrupting the V2X applications.

When Application Layer IDs change, the source Layer-2 ID(s) of the PC5 unicast link(s) shall be changed if the link(s) was used for V2X communication with the changed Application Layer IDs.

A UE may establish multiple PC5 unicast links with a peer UE and use the same or different source Layer-2 IDs for these PC5 unicast links.

Editor's note: Further updates of the identifier description may be required based on RAN WG feedback.

6.3.3 Unicast Mode V2X Communication Over PC5 Reference Point 6.3.3.1 Layer-2 Link Establishment Over PC5 Reference Point To perform unicast mode of V2X communication over PC5 reference point, the UE is configured with the related information as described in clause 5.1.2.1.

Figure 6:
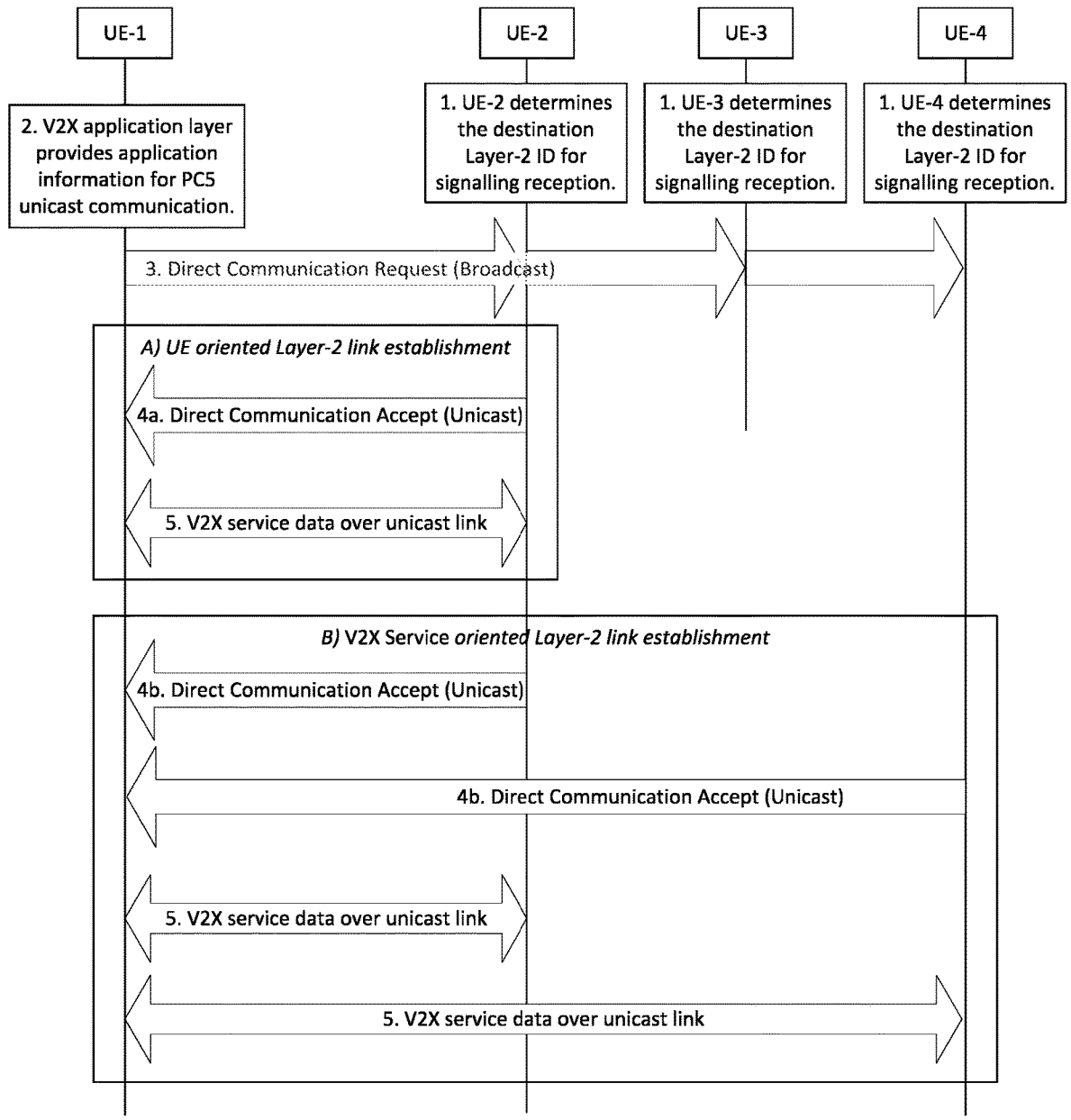
FIG. 6 is a reproduction of FIG. 6.3.3.1-1 of 3GPP TS 23.287 V16.0.0.

FIG. 6.3.3.1-1 shows the layer-2 link establishment procedure for unicast mode of V2X communication over PC5 reference point.

[FIG. 6.3.3.1-1 of 3GPP TS 23.287 V16.0.0, entitled "Layer-2 link establishment procedure", is reproduced as FIG. 6]

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.

2. The V2X application layer in UE-1 provides application information for PC5 unicast communication. The application information includes the service type(s) (e.g. PSID or ITS-AID) of the V2X application and the initiating UE's Application Layer ID. The target UE's Application Layer ID may be included in the application information.

The V2X application layer in UE-1 may provide V2X Application Requirements for this unicast communication. UE-1 determines the PC5 QoS parameters and PFI as specified in clause 5.4.1.4.

If UE-1 decides to reuse the existing PC5 unicast link as specified in clause 5.2.1.4, the UE triggers Layer-2 link modification procedure as specified in clause 6.3.3.4.

3. UE-1 sends a Direct Communication Request message to initiate the unicast layer-2 link establishment procedure. The Direct Communication Request message includes:

Source User Info: the initiating UE's Application Layer ID (i.e. UE-1's Application Layer ID).

If the V2X application layer provided the target UE's Application Layer ID in step 2, the following information is included:

Target User Info: the target UE's Application Layer ID (i.e. UE-2's Application Layer ID).

V2X Service Info: the information about V2X Service(s) requesting Layer-2 link establishment (e.g. PSID(s) or ITS-AID(s)).

Indication whether IP communication is used.

IP Address Configuration: For IP communication, IP address configuration is required for this link and indicates one of the following values:

"IPv6 Router" if IPv6 address allocation mechanism is supported by the initiating UE, i.e., acting as an IPv6 Router; or "IPv6 address allocation not supported" if IPv6 address allocation mechanism is not supported by the initiating UE.

Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc).

The source Layer-2 ID and destination Layer-2 ID used to send the Direct Communication Request message are determined as specified in clauses 5.6.1.1 and 5.6.1.4.

UE-1 sends the Direct Communication Request message via PC5 broadcast using the source Layer-2 ID and the destination Layer-2 ID.

4. A Direct Communication Accept message is sent to UE-1 as below:

4a. (UE oriented Layer-2 link establishment) If the Target User Info is included in the Direct Communication Request message, the target UE, i.e. UE-2 responds with a Direct Communication Accept message.

4b. (V2X Service oriented Layer-2 link establishment) If the Target User Info is not included in the Direct Communication Request message, the UEs that are interested in using the announced V2X Service(s), so decide to establish Layer-2 link with UE-1 respond to the request by sending a Direct Communication Accept message (UE-2 and UE-4 in FIG. 6.3.3.1-1).

The Direct Communication Accept message includes:
  Source User Info: Application Layer ID of the UE sending the Direct Communication Accept message.
  QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc).
  IP Address Configuration: For IP communication, IP address configuration is required for this link and indicates one of the following values:
    "IPv6 Router" if IPv6 address allocation mechanism is supported by the target UE, i.e., acting as an IPv6 Router; or
    "IPv6 address allocation not supported" if IPv6 address allocation mechanism is not supported by the target UE.
  Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.
  If both UEs (i.e. the initiating UE and the target UE) selected to use link-local IPv6 address, they shall disable the duplicate address detection defined in RFC 4862 [21].

NOTE 1: When either the initiating UE or the target UE indicates the support of IPv6 router, corresponding address configuration procedure would be carried out after the establishment of the layer 2 link, and the link-local IPv6 addresses are ignored.
  The source Layer-2 ID used to send the Direct Communication Accept message is determined as specified in clauses 5.6.1.1 and 5.6.1.4. The destination Layer-2 ID is set to the source Layer-2 ID of the received Direct Communication Request message.
  Upon receiving the Direct Communication Accept message from peer UE, UE-1 obtains the peer UE's Layer-2 ID for future communication, for signalling and data traffic for this unicast link.
  The V2X layer of the UE that established PC5 unicast link passes the PC5 Link Identifier assigned for the unicast link and PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

Editor's note: Steps for mutual authentication and security association establishment will be determined based on feedback from SA WG3.

5. V2X service data is transmitted over the established unicast link as below:
  The PC5 Link Identifier and PFI are provided to the AS layer, together with the V2X service data.
  UE-1 sends the V2X service data using the source Layer-2 ID (i.e. UE-Vs Layer-2 ID for this unicast link) and the destination Layer-2 ID (i.e. the peer UE's Layer-2 ID for this unicast link).

NOTE 2: PC5 unicast link is bi-directional, therefore the peer UE of UE-1 can send the V2X service data to UE-1 over the unicast link with UE-1.

Editor's note: The parameters included in the Direct Communication Request/Accept messages can be updated depending on RAN WGs' decision on how the Direct Communication Request/Accept messages are sent by the AS layer (e.g. by using PC5-RRC signalling).

Editor's note: Additional parameters included in the Direct Communication Request/Accept messages (e.g. security related) are FFS.

Editor's note: Whether the unicast communication requires security protection at link layer will be determined based on feedback from SA WG3.

In 3GPP TS 33.303, security for direct link signaling and direct link user plane traffic in one-to-one sidelink communication (i.e. unicast mode communication) is specified as follows:

6.5 Security for One-to-One ProSe Direct Communication 6.5.2 Security Requirements The following are the security requirements for ProSe Direct One-to-one Communication:
  A ProSe-enabled UE shall use different security contexts for ProSe one-to-one communication with different ProSe-enabled UEs.
  Direct link signalling ciphering shall be supported and may be used. Direct link signalling ciphering is a configuration option.
  Direct link user plane ciphering shall be supported and may be used.
  Direct link signalling integrity protection and replay protection shall be supported and used.
  Direct link user plane packets between UEs shall not be integrity protected.
  Establishment of the security between the UEs shall be protected from man-in-the-middle attacks.
  The system should support mutual authentication of public safety UEs out of network coverage.
  Compromise of a single UE should not affect the security of the others.
  Authentication credentials should be securely stored in UE.

6.5.3 Overview of One-to-One ProSe Direct Communication 6.5.3.1 Description of Different Layers of Keys and their Identities ProSe Direct One-to-one communication uses 4 different layers of keys. These are the following:
  Long term key: This is the key that is provisioned (see the individual cases in 6.5.4 for more information on the provisioning) into the UE and is the root of the security for one-to-one communications. It may be a symmetric key or public/private key pair depending on the particular use case. Authentication signalling (denoted as "Direct Authentication and Key Establishment"—see subclause 6.5.4) is exchanged between the UEs and possibly some entities in the network, for example in the ProSe UE-to-network relay case to derive the $K_D$. The long term key is identified by the Long term ID.

$K_D$: This is a 256-bit root key that is shared between the two entities communicating using ProSe Direct one-to-one communications. It may be refreshed by re-running the authentication signalling using the Long term key. In order to generate a $K_{D\text{-}sess}$ (the next layer of keys), nonces are exchanged between the communicating entities. $K_D$ may be kept even when the UEs have no active one-to-one communication session between them. The $K_D$ ID is used to identify $K_D$.

$K_{D\text{-}sess}$: This is the 256-bit key that is the root of the actual security context that is being used (or at least in the process of being established) to protect the transfer of data between the UEs. During a communication between the UEs, the $K_{D\text{-}sess}$ may be refreshed by running the rekeying procedure (see subclause 6.X.5.3). The actual keys (see next bullet) that are used in the confidentiality and integrity algorithms are derived directly from $K_{D\text{-}sess}$. The 16 bit $K_{D\text{-}sess}$ ID identifies the $K_{D\text{-}Sess}$.

A $K_{D\text{-}sess}$ ID with a zero value indicates no security is used and hence the UEs shall not assign an all zero value of $K_{D\text{-}sess}$ ID when creating a security context.

PEK and PIK: The ProSe Encryption Key (PEK) and ProSe Integrity Key (PIK) are used in the chosen confidentiality and integrity algorithms respectively. They are derived from $K_{D\text{-}sess}$ and are refreshed automatically every time $K_{D\text{-}sess}$ is changed.

6.5.5.2 Security Establishment During Connection Set-Up

The subclause describes how security is established during connection set-up. The signalling flow is shown in FIG. 6.5.5.2-1.

Figure 7:
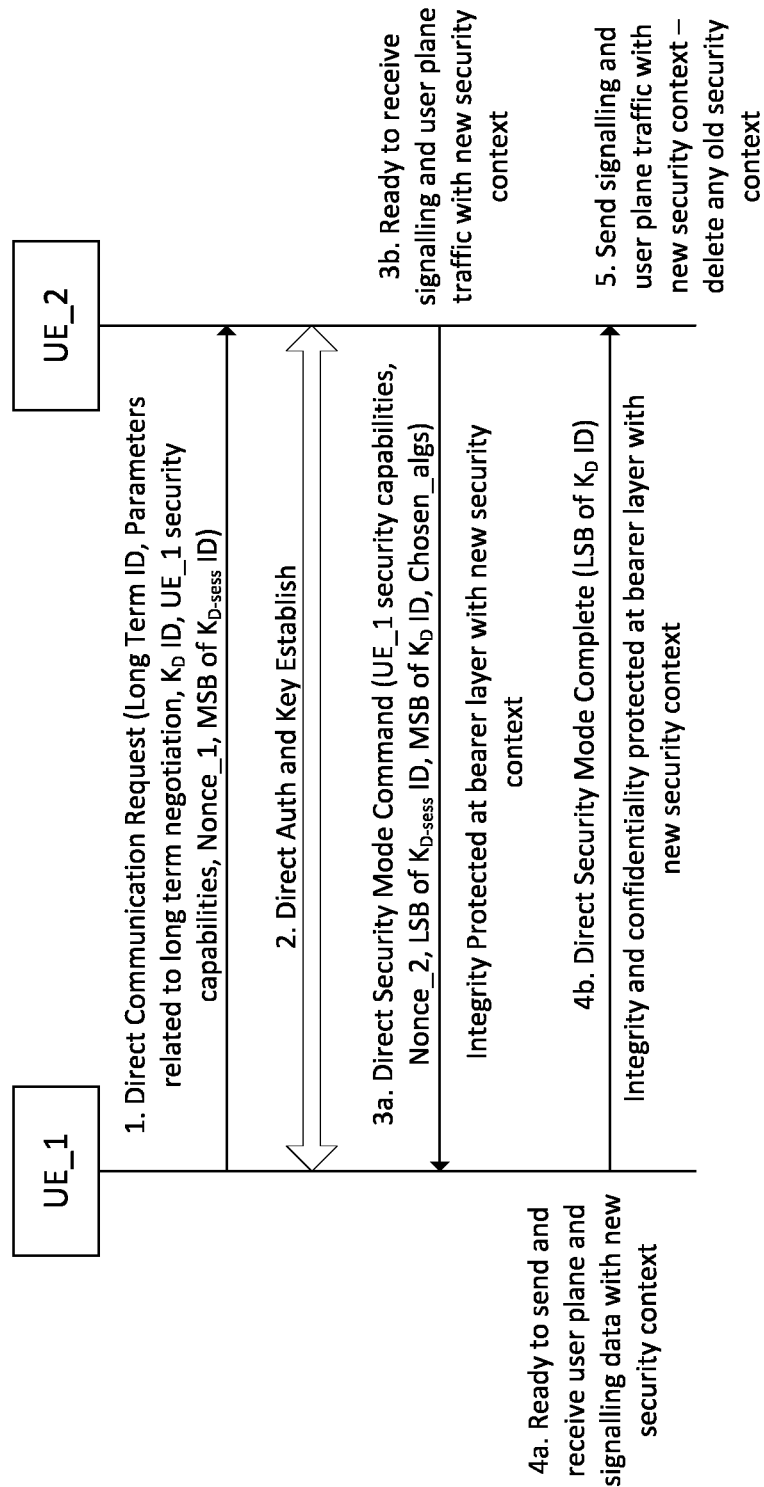
FIG. 7 is a reproduction of FIG. 6.5.5.2-1 of 3GPP TS 33.303 V15.0.0.

[FIG. 6.5.5.2-1 of 3GPP TS 33.303 V15.0.0, entitled "Security establishment at connection set-up", is reproduced as FIG. 7]

1. UE_1 has sent a Direct Communication Request to UE_2. This message shall include Nonce_1 (for session key generation), UE_1 security capabilities (the list of algorithms that UE_1 will accept for this connection) and the most significant 8-bits of the $K_{D\text{-}sess\ ID}$. These bits shall be chosen such that UE_1 will be able to locally identify a security context that is created by this procedure. The message may also include a $K_D$ ID if the UE_1 has an existing $K_D$ with the UE that it trying to communicate with. The absence of the $K_D$ ID parameter indicates that UE_1 does not have a $K_D$ for UE_2. The message shall also contain the necessary information to establish a $K_D$ from the relevant long terms keys held on the UE (see subclause 6.X.4). Long term ID is the info needed by the UE_2 in order to retrieve the right Long term Key.

2. UE_2 may initiate a Direct Auth and Key Establish procedure with UE_1. This is mandatory if the UE_2 does not have the $K_D$ and $K_D$ ID pair indicated in step 1, and signalling is needed to establish the keys for the particular use case.

3. UE_2 sends the Direct Security Mode Command to UE_1. It shall include the most significant bits of $K_D$ ID if a fresh $K_D$ is generated, Nonce_2 to allow a session key to be calculated and the Chosen_algs parameter to indicate which security algorithms the UEs will use to protect the data. The included bits of $K_D$ ID shall uniquely identify the $K_D$ at UE_2. UE_2 shall also return the UE_1 security capabilities to provide protection against bidding down attacks. UE_2 also includes the least significant 8-bits of $K_{D\text{-}sess}$ ID in the messages. This bits are chosen so that UE_2 will be able to locally identify a security context that is created by this procedure. UE_2 calculates $K_{D\text{-}sess}$ from $K_D$ and Nonce_1 and Nonce_2 (see Annex A.9) and then derives the confidentiality and integrity keys based on the chosen algorithms (Annex A.4).

UE_2 then integrity protects the Direct Security Mode Command before sending it to UE_1. UE_2 is then ready to receive both signalling and user plane traffic protected with the new security context. UE_2 shall form the $K_{D\text{-}sess}$ ID from the most significant bits it received in message 1 and least significant bits it sent in message 3.

4. On receiving the Direct Security Mode Command, UE_1 shall calculate $K_{D\text{-}sess}$ and the confidentiality and integrity keys in the same way as UE_2. UE_1 shall check that the returned UE_1 security capabilities are the same as those it sent in step 1. UE_1 shall also check the integrity protection on the message. If both these checks pass, then UE_1 is ready to send and receive signalling and user traffic with the new security context. If most significant bits of $K_D$ ID were included in the Direct Security Mode Command, UE_1 shall generate the least significant bits of $K_D$ ID such that these bits uniquely identify $K_D$ at UE_1 and shall store the complete $K_D$ ID with $K_D$. UE_1 shall send an integrity protected and confidentiality protected (with the chosen algorithm which may be the null algorithm) Direct Security Mode Complete message to UE_2. UE_1 shall include the least significant bits of $K_D$ ID in this message. UE_1 shall form the $K_{D\text{-}sess}$ ID from the most significant bits it sent in message 1 and least significant bits it received in message 3.

5. UE_2 checks the integrity protection on the received Direct Security Mode Complete. If this passes, UE_2 is now ready to send user plane data and control signalling protected with the new security context. UE_2 deletes any old security context it has for UE_1. UE_2 shall form the $K_D$ ID from the most significant bits it sent in step 3 and least significant bits it received in the Direct Security Mode Complete. UE_2 shall store the complete $K_D$ ID with $K_D$.

A running CR to 3GPP TS 38.331 for 5G V2X with NR Sidelink (as captured in 3GPP R2-1915983) specifies procedures related to NR sidelink communication as follows:

5.X.3 Sidelink UE Information for NR Sidelink Communication

5.X.3.1 General

Figure 8:
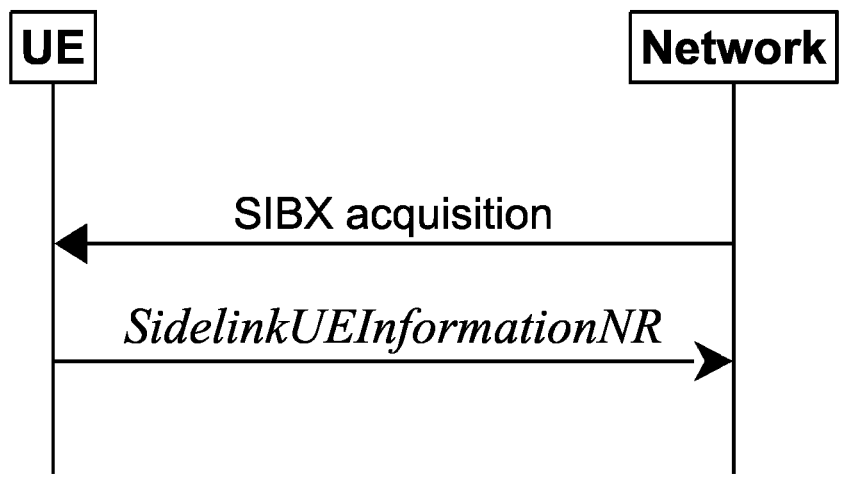
FIG. 8 is a reproduction of FIG. 5.X.3.1-1 of 3GPP R2-1915983.

[FIG. 5.X.3.1-1 of 3GPP R2-1915983, entitled "Sidelink UE information for NR sidelink communication", is reproduced as FIG. 8]

The purpose of this procedure is to inform the network that the UE is interested or no longer interested to receive NR sidelink communication, as well as to request assignment or release of transmission resource for NR sidelink communication and to report parameters related to NR sidelink communication.

5.x.3.2 Initiation

A UE capable of NR sidelink communication that is in RRC_CONNECTED may initiate the procedure to indicate it is (interested in) receiving NR sidelink communication in several cases including upon successful connection establishment or resuming, upon change of interest, upon change to a PCell broadcasting SIBX including sl-ConfigCommonNR. A UE capable of NR sidelink communication may initiate the procedure to request assignment of dedicated resources for NR sidelink communication transmission.

Upon initiating this procedure, the UE shall:
1> if SIBX including sl-ConfigCommonNR is broadcast by the PCell:
  2> ensure having a valid version of SIBX for the PCell;
  2> if configured by upper layers to receive NR sidelink communication on the frequency included in sl-FreqInfoList in SIBX of the PCell:
    3> if the UE did not transmit a SidelinkUEInformationNR message since last entering RRC_CONNECTED state; or
    3> if since the last time the UE transmitted a SidelinkUEInformationNR message the UE connected to a PCell not broadcasting SIBX including sl-ConfigCommonNR; or
    3> if the last transmission of the SidelinkUEInformationNR message did not include sl-RxInterestedFreqList; or if the frequency configured by upper layers to receive NR sidelink communication on has changed since the last transmission of the SidelinkUEInformationNR message:
      4> initiate transmission of the SidelinkUEInformationNR message to indicate the NR sidelink communication reception frequency of interest in accordance with 5.x.3.3,
  2> else:
    3> if the last transmission of the SidelinkUEInformationNR message included sl-RxInterestedFreqList:
      4> initiate transmission of the SidelinkUEInformationNR message to indicate it is no longer interested in NR sidelink communication reception in accordance with 5.x.3.3;
  2> if configured by upper layers to transmit NR sidelink communication on the frequency included in sl-FreqInfoList in SIBX of the PCell:
    3> if the UE did not transmit a SidelinkUEInformationNR message since last entering RRC_CONNECTED state; or
    3> if since the last time the UE transmitted a SidelinkUEInformationNR message the UE connected to a PCell not broadcasting SIBX including sl-ConfigCommonNR; or
    3> if the last transmission of the SidelinkUEInformationNR message did not include sl-TxResourceReqList; or if the information carried by the sl-TxResourceReqList has changed since the last transmission of the SidelinkUEInformationNR message:
      4> initiate transmission of the SidelinkUEInformationNR message to indicate the NR sidelink communication transmission resources required by the UE in accordance with 5.X.3.3;
  2> else:
    3> if the last transmission of the SidelinkUEInformationNR message included sl-TxResourceReqList:
      4> initiate transmission of the SidelinkUEInformationNR message to indicate it no longer requires NR sidelink communication transmission resources in accordance with 5.X.3.3.

5.x.3.3 Actions related to transmission of SidelinkUEInformationNR message

The UE shall set the contents of the SidelinkUEInformationNR message as follows:
1> if the UE initiates the procedure to indicate it is (no more) interested to receive NR sidelink communication or to request (configuration/release) of NR sidelink communication transmission resources (i.e. UE includes all concerned information, irrespective of what triggered the procedure):
  2> if SIBX including sl-ConfigCommonNR is broadcast by the PCell:
    3> if configured by upper layers to receive NR sidelink communication:
      4> include sl-RxInterestedFreqList and set it to the frequency for NR sidelink communication reception;
    3> if configured by upper layers to transmit NR sidelink communication:
      4> include sl-TxResourceReqList and set its fields as follows for each destination for which it requests network to assign NR sidelink communication resource:
        5> set sl-DestinationIdentiy to the destination identity configured by upper layer for NR sidelink communication transmission;
        5> set sl-CastType to the cast type of the associated destination identity configured by the upper layer for the NR sidelink communication transmission;
        5> set sl-QoS-InfoList to include QoS profile(s) of the sidelink QoS flow(s) of the associated destination configured by the upper layer for the NR sidelink communication transmission;
        5> set sl-InterestedFreqList to indicate the frequency for NR sidelink communication transmission;
        5> set sl-TypeTxSyncList to the current synchronization reference type used on the associated sl-InterestedFreqList for NR sidelink communication transmission.
1> The UE shall submit the SidelinkUEInformationNR message to lower layers for transmission.

Editor's Notes: FFS on how to handle the RLF case with or without failure indication.

[ . . . ]

5.x.9.1.6 Sidelink SRB Addition

The UE shall:
1> if a PC5-RRC connection establishment for a specific destination is requested by upper layers:
  2> establish PDCP entity, RLC entity and the logical channel of a sidelink SRB for PC5-S message, as specified in sub-clause 9.1.1.X;
  2> establish PDCP entity, RLC entity and the logical channel of a sidelink SRB for PC5-RRC message, as specified in sub-clause 9.1.1.X;
  2> consider the PC5-RRC connection is established for the destination.

5.x.9.1.7 Sidelink SRB Release

The UE shall:
1> if a PC5-RRC connection release for a specific destination is requested by upper layers; or
1> if the sidelink radio link failure is detected for a specific destination:
  2> release the PDCP entity, RLC entity and the logical channel of the sidelink SRB for PC5-RRC message of the destination;

2> consider the PC5-RRC connection is released for the destination.
1> if a PC5-S connection release for a specific destination is requested by upper layers; or
2> release the PDCP entity, RLC entity and the logical channel of the sidelink SRB for PC5-S message of the destination;
[ . . . ]

9.1.1.X SCCH Configuration

Parameters that are specified for unicast of NR sidelink communication, which is used for the sidelink signalling radio bearer of PC5-RRC message.

| Name | Value | Semantics description | Ver |
|---|---|---|---|
| PDCP configuration | | | |
| >t-Reordering | Undefined | Selected by the receiving UE, up to UE implementation | |
| >pdcp-SN-Size | 12 (FFS) | | |
| RLC configuration | | | |
| >sn-FieldLength | 12 | | |
| >t-Reassembly | Undefined | Selected by the receiving UE, up to Up to UE implementation | |
| >logicalChannelIdentity | 1 | | |
| MAC configuration | | | |
| >priority | 1 | | |
| >prioritisedBitRate | infinity | | |
| >logicalChannelGroup | 0 | | |

Parameters that are specified for unicast of NR sidelink communication, which is used for the sidelink signalling radio bearer of PC5-S message.

| Name | Value | Semantics description | Ver |
|---|---|---|---|
| PDCP configuration | | | |
| >t-Reordering | Undefined | Selected by the receiving UE, up to UE implementation | |
| >pdcp-SN-Size | 12 | | |
| RLC configuration | | | |
| >sn-FieldLength | 12 | | |
| >t-Reassembly | Undefined | Selected by the receiving UE, up to Up to UE implementation | |
| >logicalChannelIdentity | 0 | | |
| MAC configuration | | | |
| >priority | 1 | | |
| >prioritisedBitRate | infinity | | |
| >logicalChannelGroup | 0 | | |

A running CR to 3GPP TS 38.321 for 5G V2X with NR Sidelink (as captured in 3GPP R2-196120) specifies MAC PDU for NR sidelink communication as follows:

6.1.x MAC PDU (SL-SCH)

A MAC PDU consists of one SL-SCH subheader and one or more MAC subPDUs. Each MAC subPDU consists of one of the following:
A MAC subheader only (including padding);
A MAC subheader and a MAC SDU;
A MAC subheader and padding.
The MAC SDUs are of variable sizes.
Each MAC subheader except SL-SCH subheader corresponds to either a MAC SDU or padding.
The SL-SCH subheader is of a fixed size and consists of the seven header fields [V/R/R/R/R/SRC/DST].

Figure 9:
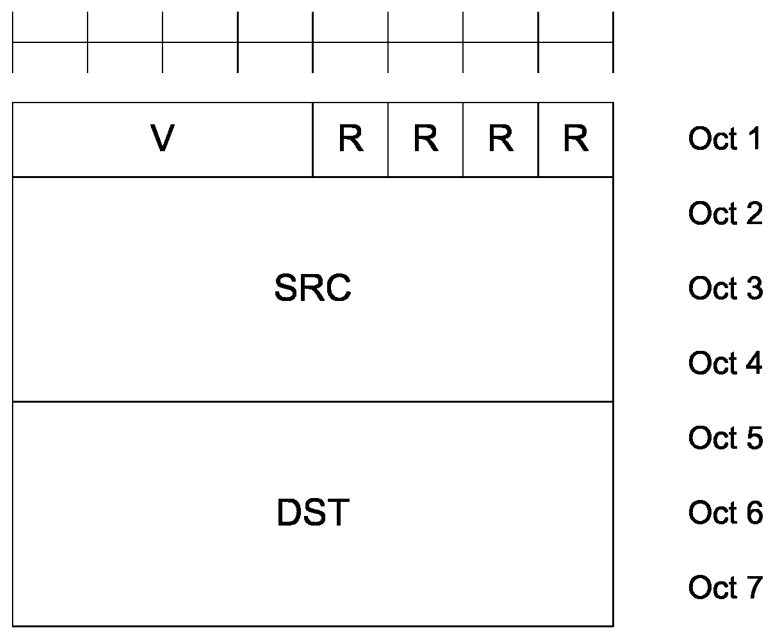
FIG. 9 is a reproduction of FIG. 6.1.x-1 of 3GPP R2-1916120.

[FIG. 6.1.x-1 of 3GPP R2-1916120, entitled "SL-SCH MAC subheader", is reproduced as FIG. 9]

Editor's Note: FFS on the format of the SL-SCH MAC subheader e.g. need of V field, SRC/DST sizes.

A MAC subheader except for padding consists of the four header fields R/F/LCID/L as depicted in FIG. 6.1.2-1 (with 8-bit L field) and FIG. 6.1.2-2 (with 16-bit L field). A MAC subheader for padding consists of the two header fields R/LCID as depicted in FIG. 6.1.2-3.

SL MAC subPDU(s) with MAC SDU(s) is placed after the SL-SCH subheader and before the MAC subPDU with padding in the MAC PDU as depicted in FIG. 6.1.x-1. The size of padding can be zero.

Figure 10:
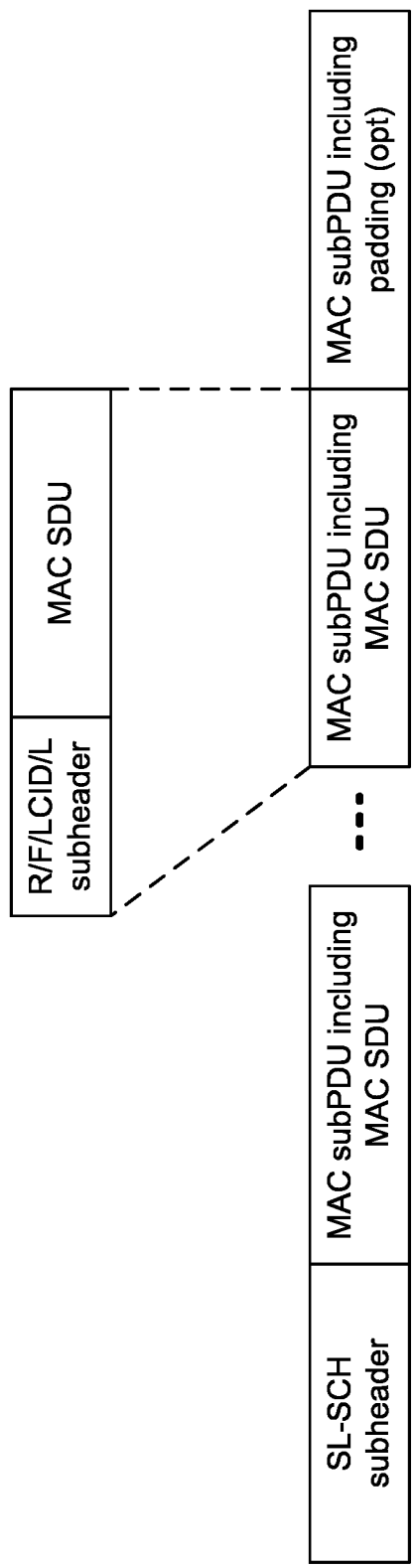
FIG. 10 is a reproduction of FIG. 6.1.x-2 of 3GPP R2-1916120.

[FIG. 6.1.x-2 of 3GPP R2-1916120, entitled "Example of a SL MAC PDU", is reproduced as FIG. 10]

A maximum of one MAC PDU can be transmitted per TB per MAC entity.

The following agreements on Source ID and Destination ID indication for NR sidelink transmission were made in the RAN2 #108 meeting (as captured in 3GPP R2-1916288):

1: For all cast-types, Layer-1 Destination ID corresponds to the 16 bit LSB of the Destination Layer-2 ID, and the Layer-1 Source ID corresponds to the 8 bit LSB of the Source Layer-2 ID.

2: The DST field includes 8 bit MSB of the Destination Layer-2 ID and the SRC field includes 16 bit MSB of the Source Layer-2 ID for the SL-SCH subheader of a MAC PDU to be transmitted to the peer UE.

3GPP TS 23.287 specifies a layer-2 link establishment procedure for unicast mode of V2X communication over PC5 reference point in Section 6.3.3.1. For example, the initiating UE (e.g. UE1) transmits a Direct Communication Request message and receives a Direct Communication Accept message from other UE(s). According to Section 5.6.1.4 of 3GPP TS 23.287, the initial signalling for the establishment of the PC5 unicast link may use a default destination Layer-2 ID associated with the service type (e.g. PSID/ITS-AID) configured for PC5 unicast link establishment.

In the Direct Communication Request message, UE2's application layer ID and UE1's application layer ID are included so that UE2 can determine if to respond to the Direct Communication Request message. If UE2 determines to respond to the Direct Communication Request message, UE2 may initialize the procedure used to establish the security context. A security configuration procedure used to establish security context during sidelink connection setup or unicast link establishment was specified in 3GPP TS 33.303. For example, UE1 transmits a Direct Communication Request to UE2. In the Direct Communication Request, some parameters used to establish security context could be included. Upon reception of the Direct Communication Request, UE2 may optionally initiate a Direct Auth and Key Establish procedure with UE1 to establish a security key if the security key is not present. And then, UE2 may activate the security functionality. For example, UE2 may transmit a Direct Security Mode Command to UE1, and UE1 responds to UE2 with a Direct Security Mode Complete. In addition, if the Direct Security Mode Complete is received successfully, UE2 may transmit a Direct Communication Accept to UE1. In case security is not needed for a unicast link, the related security procedures may be omitted, and UE2 may reply the Direct Communication Accept to UE1 directly.

When the Direct Communication Request message is transmitted, the source Layer-2 ID is derived from (or set to) Layer-2 ID of the initiating UE and the destination Layer-2 ID is derived from (or set to) the default destination Layer-2

ID associated with the service type. Then, UE2 may start to exchange signalling in the security establishment procedure based on the Layer-2 ID of UE1 and a Layer-2 ID of UE2 assigned for the unicast link after receiving the Direct Communication Request message.

More specifically, a Layer-2 ID may be split into two parts, one part is indicated in Layer 1 signaling and the other part is included in the MAC subheader of a MAC PDU. For example, Layer-1 Destination ID corresponds to the 16 bit LSB of the Destination Layer-2 ID and the Layer-1 Source ID corresponds to the 8 bit LSB of the Source Layer-2 ID, while the DST field in the MAC subheader includes 8 bit MSB of the Destination Layer-2 ID and the SRC field in the MAC subheader includes 16 bit MSB of the Source Layer-2 ID.

Section 9.1.1.X in 3GPP R2-1915983 specifies Sidelink Control Channel (SCCH) configurations of Sidelink (SL) SRBs used for transmitting and receiving PC5-Radio Resource Control (PC5-RRC) messages and PC5-S messages, wherein each SL SRB corresponds to a SCCH. PC5-S messages are upper layer messages (e.g. Direct Communication Request, Direct Communication Accept, Direct Security Mode Command, Direct Security Mode Complete, etc.), and PC5-RRC messages are used for exchanging AS configuration and UE capability between peer UEs (e.g. rrcReconfigurationSidelink, rrcReconfigurationCompleteSidelink, rrcReconfigurationFailureSidelink, ueCapabilityEnquirySidelink, and ueCapabilityInformationSidelink, etc.).

Basically, a UE in RRC_IDLE may select resources from a sidelink resource pool defined in system information for sidelink transmission, while a UE in RRC_CONNECTED may send a Sidelink UE Information message (e.g. SidelinkUEInformationNR) to gNB to request dedicated sidelink resources for sidelink transmission.

Section 5.x.9.1.6 of 3GPP R2-1915983 specifies that if a PC5-RRC connection establishment for the destination is requested by upper layers, a UE shall establish two SL SRBs for both PC5-S messages and PC5-RRC messages respectively, and shall consider the PC5-RRC connection is established for a specific destination. Here, a PC5-RRC connection is a logical connection between a pair of a Source Layer-2 ID and a Destination Layer-2 ID, and one PC5-RRC connection corresponds to one PC5 unicast link. Besides, a SL SRB may be associated with a Packet Data Convergence Protocol (PDCP) entity, Radio Link Control (RLC) entity, and a logical channel. Accordingly, a SL SRB may be associated with a Source Layer-2 ID and Destination Layer-2 ID pair. Currently, it is not clear whether each Destination Layer-2 ID is unique. If this is the case, a SL SRB may be considered to be associated with a Destination Layer-2 ID.

Since a PC5-RRC connection corresponds to a PC5 unicast link, establishment of the RRC connection means establishment of the concerned unicast link. As described above, a UE needs to exchange PC5-S messages in order to establish a unicast link. Therefore, a first SL SRB associated with a default Destination Layer-2 ID for PC5-S message transmission needs to be established when (or if) the PC5 unicast link or the PC5-RRC connection establishment procedure is initiated (i.e. before the PC5 unicast link is established), while the UE does not need to establish the SL SRB for PC5-RRC message transmission when the PC5 unicast link establishment procedure is initiated because there is no need for both UEs to exchange PC5-RRC messages during the unicast link establishment.

Besides, the peer UE will transmit a security related PC5-S message (e.g. Direct Security Mode Command message) to the UE in response to reception of the first PC5-S message (e.g. Direct Communication Request) from the UE. When receiving the sidelink transmission or MAC PDU of the security related PC5-S message from the peer UE, the UE needs to establish a second SL SRB associated with the Layer-2 ID of the peer UE for further processing the sidelink transmission or MAC PDU and/or replying another security related PC5-S message (e.g. Direct Security Mode Complete message) to the peer UE. In addition, the UE may also release the first SL SRB when (or if) receiving the security related PC5-S message from the peer UE.

In one embodiment, the UE may establish a third sidelink SRB associated with the Layer-2 ID of the peer UE for PC5-RRC message transmission when (or if) the PC5 unicast link or the PC5-RRC connection has been successfully established. Alternatively, the third sidelink SRB associated with the Layer-2 ID of the peer UE for PC5-RRC message transmission may be established when (or if) the security related PC5-S message (e.g. the Direct Security Mode Command message) is received from the peer UE. The PC5 unicast link or the PC5-RRC connection is successfully established when (or if) a Direct Communication Accept message is received from the peer UE.

It is possible there may be two separate sidelink SRBs for PC5-S message transmissions, one with security protection and the other without security protection. It is also possible one sidelink SRB is used for PC5-S message transmission with security protection and the other sidelink SRB is used for security activation. If this is the case, the UE may establish a fourth sidelink SRB associated with the Layer-2 ID of the peer UE for transmitting PC5-S messages that are protected when (or if) the PC5 unicast link or the PC5-RRC connection has been successfully established. Alternatively, the fourth sidelink SRB may be established when (or if) the security related PC5-S message (e.g. the Direct Security Mode Command message) is received from the peer UE. In this case, the fourth SL SRB may not be used for transmitting security related PC5-S message.

For establishing a SL SRB associated with the Layer-2 ID of the peer UE, the UE may transmit a sidelink UE information message to gNB to request dedicated resources for sidelink transmissions addresses to the Layer-2 ID of the peer UE. The gNB may then reply a RRC Reconfiguration message to configure the dedicated resources. Accordingly, the UE may establish the second SL SRB or the third sidelink SRB when receiving the RRC Reconfiguration message from the gNB.

In one embodiment, establishing a sidelink SRB may include establishing a PDCP entity, a RLC entity, a logical channel associated with the sidelink SRB. Furthermore, releasing a sidelink SRB may include releasing a PDCP entity, a RLC entity, a logical channel associated with the sidelink SRB. Also, the logical channel of the first SL SRB associated with a default Destination Layer-2 ID for PC5-S message transmission may be configured with a UM RLC entity, and each of the logical channel of the second SL SRB associated with a Layer-2 ID of the peer UE for PC5-S message transmission and the logical channel of the third SL SRB associated with a Layer-2 ID of the peer UE for PC5-RRC message transmission may be configured with an Acknowledged Mode (AM) RLC entity.

Figure 11:
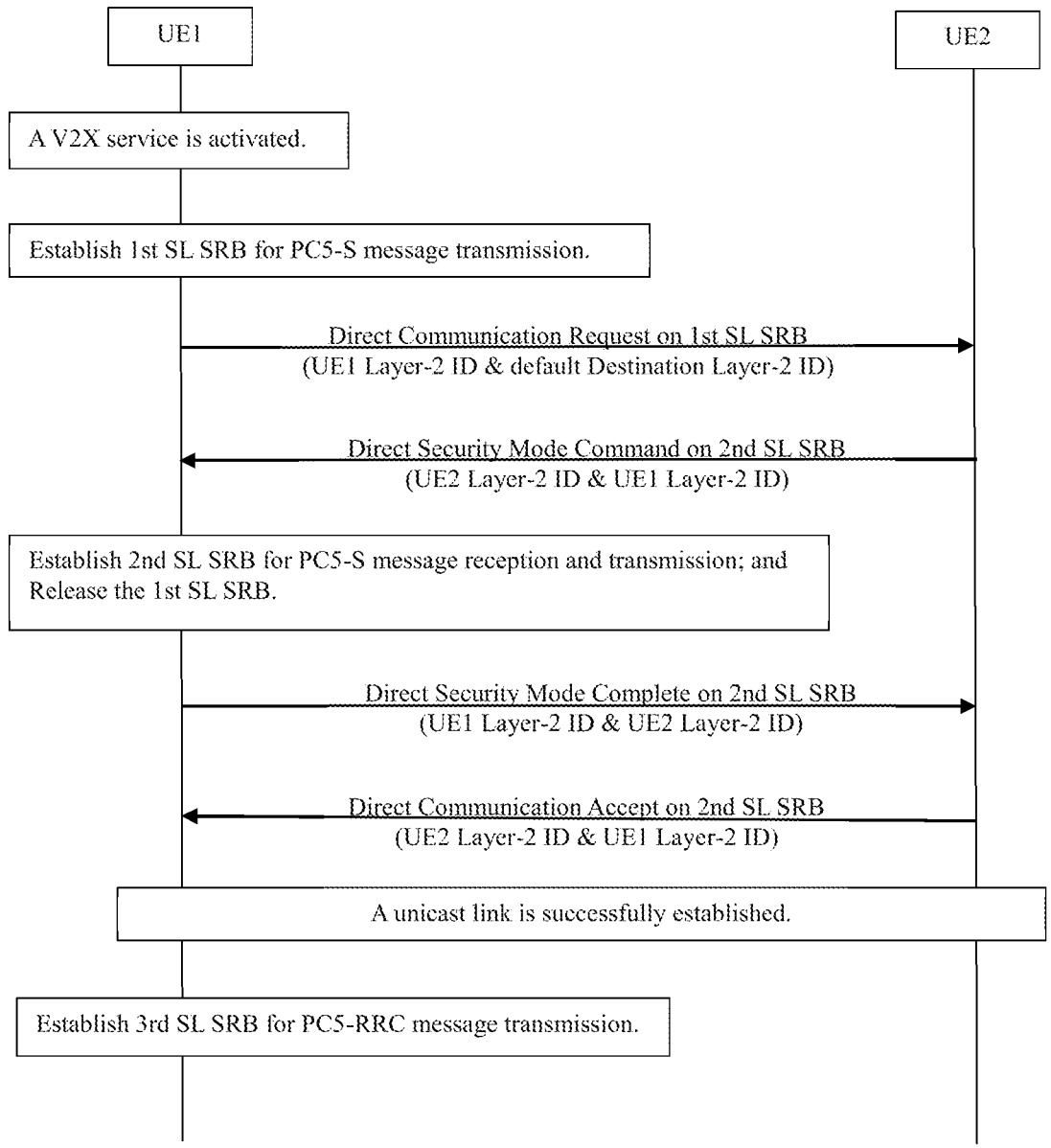
FIG. 11 is a diagram according to one exemplary embodiment.

FIG. 11 illustrates an example of the above solution according to one exemplary embodiment.

Figure 12:
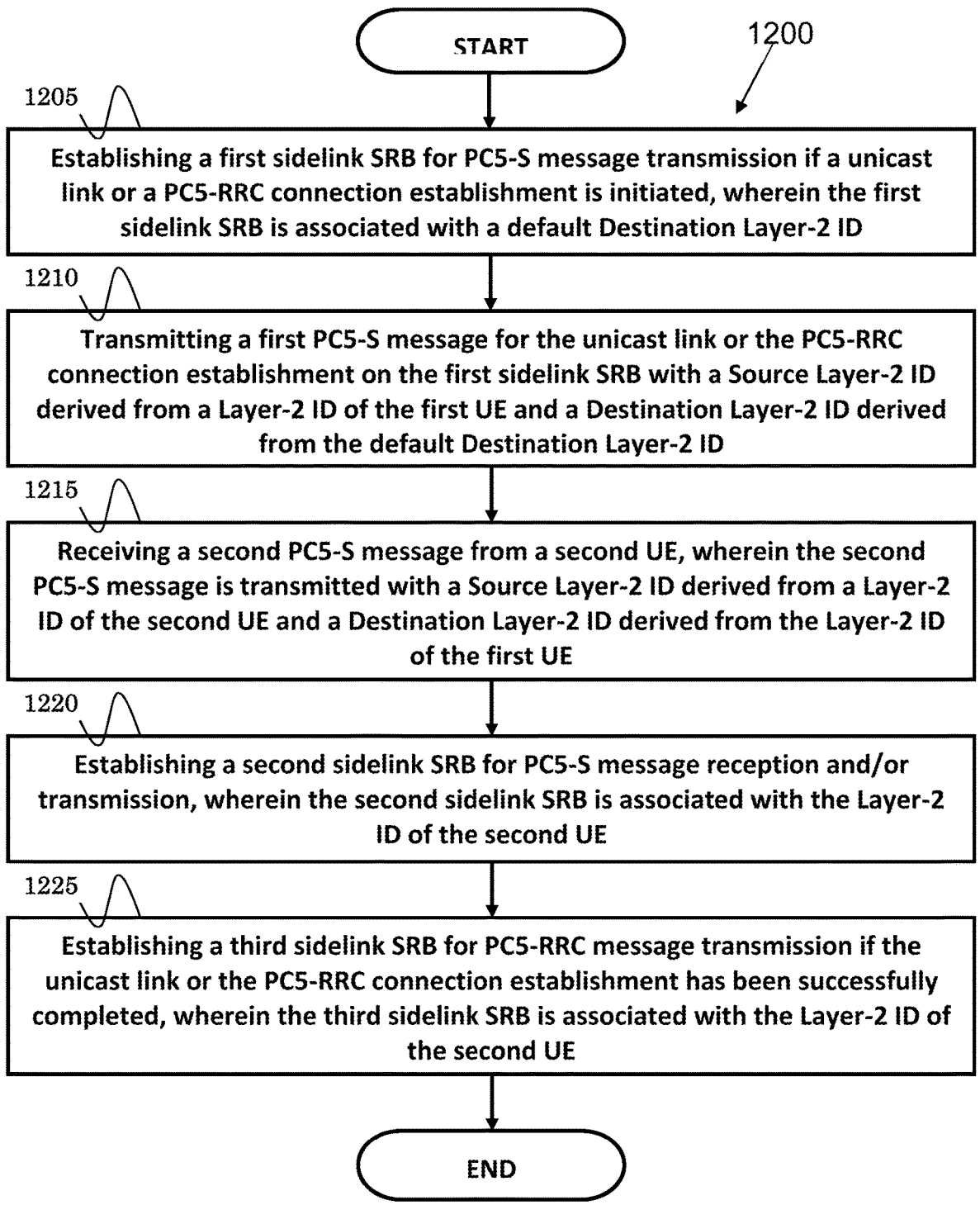
FIG. 12 is a flow chart according to one exemplary embodiment.

FIG. 12 is a flow chart 1200 according to one exemplary embodiment from the perspective of a first UE for establishing a unicast link. In step 1205, the first UE establishes a first sidelink SRB for PC5-S message transmission if a unicast link or a PC5-RRC connection establishment is initiated, wherein the first sidelink SRB is associated with a default Destination Layer-2 ID. In step 1210, the first UE transmits a first PC5-S message for the unicast link or the PC5-RRC connection establishment on the first sidelink SRB with a Source Layer-2 ID derived from a Layer-2 ID of the first UE and a Destination Layer-2 ID derived from the default Destination Layer-2 ID. In step 1215, the first UE receives a second PC5-S message from a second UE, wherein the second PC5-S message is transmitted with a Source Layer-2 ID derived from a Layer-2 ID of the second UE and a Destination Layer-2 ID derived from the Layer-2 ID of the first UE. In step 1220, the first UE establishes a second sidelink SRB for PC5-S message reception and/or transmission, wherein the second sidelink SRB is associated with the Layer-2 ID of the second UE. In step 1225, the first UE establishes a third sidelink SRB for PC5-RRC message transmission if the unicast link or the PC5-RRC connection establishment has been successfully completed, wherein the third sidelink SRB is associated with the Layer-2 ID of the second UE.

In one embodiment, the first UE could establish a fourth sidelink SRB for protected PC5-S message transmission, wherein the fourth sidelink SRB is associated with the Layer-2 ID of the second UE. The first UE may not establish any sidelink SRB for PC5-RRC message transmission before the unicast link or the PC5-RRC connection establishment has been successfully completed.

In one embodiment, the second sidelink SRB could be established in response to reception of the second PC5-S message by a physical layer of the first UE. A first Sidelink Control Channel (SCCH) configuration specified in a RRC specification could be used for establishing the first sidelink SRB and the second sidelink SRB. A second Sidelink Control Channel (SCCH) configuration specified in a RRC specification could be used for establishing the third sidelink SRB.

In one embodiment, the default Destination Layer-2 ID could be associated with a sidelink service for which the unicast link or the PC5-RRC connection is established. The first PC5-S message could be a Direct Communication Request. The second PC5-S message could be a security related message.

In one embodiment, each sidelink SRB may correspond to a Sidelink Control Channel (SCCH).

Referring back to FIGS. 3 and 4, in one exemplary embodiment of a first UE for establishing a unicast link. The first UE 300 includes a program code 312 stored in the memory 310. The CPU 308 could execute program code 312 to enable the first UE (i) to establish a first sidelink SRB for PC5-S message transmission if a unicast link or a PC5-RRC connection establishment is initiated, wherein the first sidelink SRB is associated with a default Destination Layer-2 ID, (ii) to transmit a first PC5-S message for the unicast link or the PC5-RRC connection establishment on the first sidelink SRB with a Source Layer-2 ID derived from a Layer-2 ID of the first UE and a Destination Layer-2 ID derived from the default Destination Layer-2 ID, (iii) to receive a second PC5-S message from a second UE, wherein the second PC5-S message is transmitted with a Source Layer-2 ID derived from a Layer-2 ID of the second UE and a Destination Layer-2 ID derived from the Layer-2 ID of the first UE, (iv) to establish a second sidelink SRB for PC5-S message reception and/or transmission, wherein the second sidelink SRB is associated with the Layer-2 ID of the second UE, and (v) to establish a third sidelink SRB for PC5-RRC message transmission if the unicast link or the PC5-RRC connection establishment has been successfully completed, wherein the third sidelink SRB is associated with the Layer-2 ID of the second UE. Furthermore, the CPU 308 can execute the program code 312 to perform all of the above-described actions and steps or others described herein.

Figure 13:
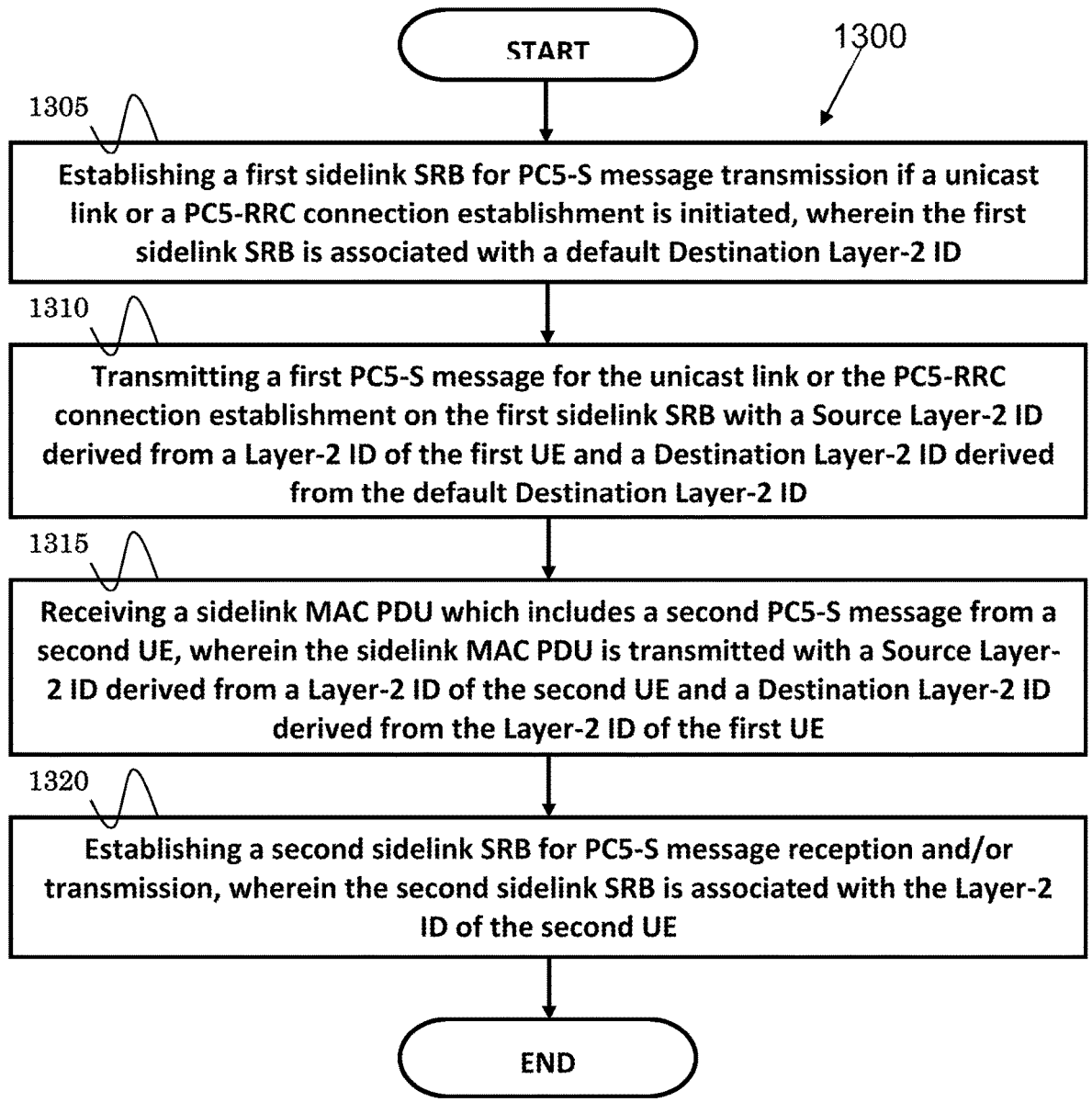
FIG. 13 is a flow chart according to one exemplary embodiment.

FIG. 13 is a flow chart 1300 according to one exemplary embodiment from the perspective of a first UE for establishing a unicast link. In step 1305, the first UE establishes a first sidelink SRB for PC5-S message transmission if a unicast link or a PC5-RRC connection establishment is initiated, wherein the first sidelink SRB is associated with a default Destination Layer-2 ID. In step 1310, the first UE transmits a first PC5-S message for the unicast link or the PC5-RRC connection establishment on the first sidelink SRB with a Source Layer-2 ID derived from a Layer-2 ID of the first UE and a Destination Layer-2 ID derived from the default Destination Layer-2 ID. In step 1315, the first UE receives a sidelink MAC PDU which includes a second PC5-S message from a second UE, wherein the sidelink MAC PDU is transmitted with a Source Layer-2 ID derived from a Layer-2 ID of the second UE and a Destination Layer-2 ID derived from the Layer-2 ID of the first UE. In step 1320, the first UE establishes a second sidelink SRB for PC5-S message reception and/or transmission, wherein the second sidelink SRB is associated with the Layer-2 ID of the second UE.

In one embodiment, the first UE could establish a third sidelink SRB for PC5-RRC message transmission if the second PC5-S message is received from the second UE, wherein the third sidelink SRB is associated with the Layer-2 ID of the second UE. The first UE could also establish a third sidelink SRB for PC5-RRC message transmission if the unicast link or the PC5-RRC connection establishment has been successfully completed, wherein the third sidelink SRB is associated with the Layer-2 ID of the second UE.

Referring back to FIGS. 3 and 4, in one exemplary embodiment of a first UE for establishing a unicast link. The first UE 300 includes a program code 312 stored in the memory 310. The CPU 308 could execute program code 312 to enable the first UE (i) to establish a first sidelink SRB for PC5-S message transmission if a unicast link or a PC5-RRC connection establishment is initiated, wherein the first sidelink SRB is associated with a default Destination Layer-2 ID, (ii) to transmit a first PC5-S message for the unicast link or the PC5-RRC connection establishment on the first sidelink SRB with a Source Layer-2 ID derived from a Layer-2 ID of the first UE and a Destination Layer-2 ID derived from the default Destination Layer-2 ID, (iii) to receive a sidelink MAC PDU which includes a second PC5-S message from a second UE, wherein the sidelink MAC PDU is transmitted with a Source Layer-2 ID derived from a Layer-2 ID of the second UE and a Destination Layer-2 ID derived from the Layer-2 ID of the first UE, and (iv) to establish a second sidelink SRB for PC5-S message reception and/or transmission, wherein the second sidelink SRB is associated with the Layer-2 ID of the second UE. Furthermore, the CPU 308 can execute the program code 312 to perform all of the above-described actions and steps or others described herein.

Figure 14:
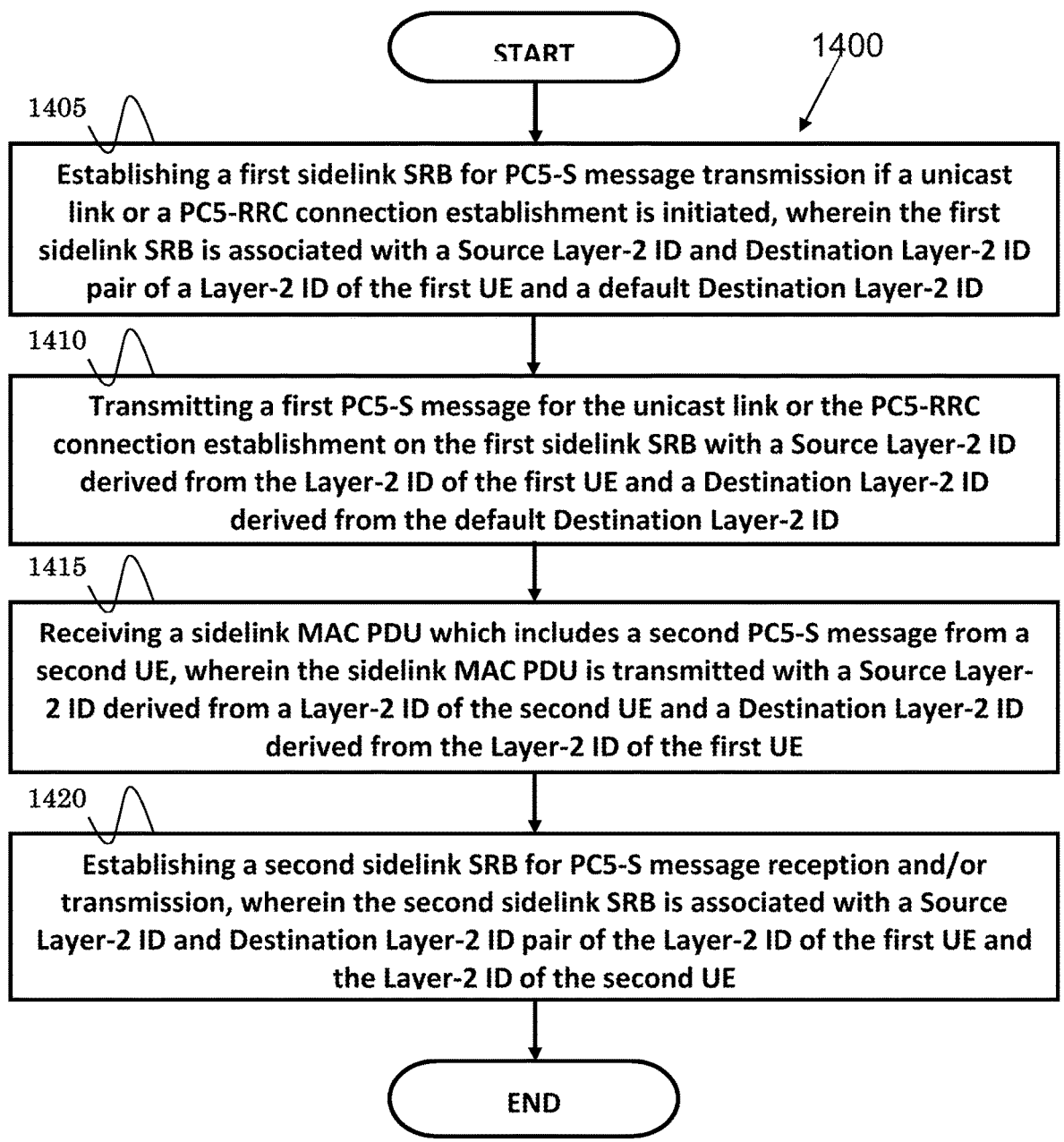
FIG. 14 is a flow chart according to one exemplary embodiment.

FIG. 14 is a flow chart 1400 according to one exemplary embodiment from the perspective of a first UE for establishing a unicast link. In step 1405, the first UE establishes a first sidelink SRB for PC5-S message transmission if a unicast link or a PC5-RRC connection establishment is initiated, wherein the first sidelink SRB is associated with a Source Layer-2 ID and Destination Layer-2 ID pair of a Layer-2 ID of the first UE and a default Destination Layer-2 ID. In step 1410, the first UE transmits a first PC5-S message for the unicast link or the PC5-RRC connection establishment on the first sidelink SRB with a Source Layer-2 ID derived from the Layer-2 ID of the first UE and a Destination Layer-2 ID derived from the default Destination Layer-2 ID. In step 1415, the first UE receives a sidelink MAC PDU which includes a second PC5-S message from a second UE, wherein the sidelink MAC PDU is transmitted with a Source Layer-2 ID derived from a Layer-2 ID of the second UE and a Destination Layer-2 ID derived from the Layer-2 ID of the first UE. In step 1420, the first UE establishes a second sidelink SRB for PC5-S message reception and/or transmission, wherein the second sidelink SRB is associated with a Source Layer-2 ID and Destination Layer-2 ID pair of the Layer-2 ID of the first UE and the Layer-2 ID of the second UE.

In one embodiment, the first UE could establish a third sidelink SRB for PC5-RRC message transmission if the second PC5-S message is received from the second UE, wherein the third sidelink SRB is associated with a Source Layer-2 ID and Destination Layer-2 ID pair of the Layer-2 ID of the first UE and the Layer-2 ID of the second UE. The first UE could also establish a third sidelink SRB for PC5-RRC message transmission if the unicast link or the PC5-RRC connection establishment has been successfully completed, wherein the third sidelink SRB is associated with a Source Layer-2 ID and Destination Layer-2 ID pair of the Layer-2 ID of the first UE and the Layer-2 ID of the second UE.

Referring back to FIGS. 3 and 4, in one exemplary embodiment of a first UE for establishing a unicast link. The first UE 300 includes a program code 312 stored in the memory 310. The CPU 308 could execute program code 312 to enable the first UE (i) to establish a first sidelink SRB for PC5-S message transmission if a unicast link or a PC5-RRC connection establishment is initiated, wherein the first sidelink SRB is associated with a Source Layer-2 ID and Destination Layer-2 ID pair of a Layer-2 ID of the first UE and a default Destination Layer-2 ID, (ii) to transmit a first PC5-S message for the unicast link or the PC5-RRC connection establishment on the first sidelink SRB with a Source Layer-2 ID derived from the Layer-2 ID of the first UE and a Destination Layer-2 ID derived from the default Destination Layer-2 ID, (iii) to receive a sidelink MAC PDU which includes a second PC5-S message from a second UE, wherein the sidelink MAC PDU is transmitted with a Source Layer-2 ID derived from a Layer-2 ID of the second UE and a Destination Layer-2 ID derived from the Layer-2 ID of the first UE, and (iv) to establish a second sidelink SRB for PC5-S message reception and/or transmission, wherein the second sidelink SRB is associated with a Source Layer-2 ID and Destination Layer-2 ID pair of the Layer-2 ID of the first UE and the Layer-2 ID of the second UE. Furthermore, the CPU 308 can execute the program code 312 to perform all of the above-described actions and steps or others described herein.

In the context of embodiments illustrated in FIGS. 13-14 and discussed above, in one embodiment, the first UE may not establish any sidelink SRB for PC5-RRC message transmission if the unicast link or the PC5-RRC connection establishment is initiated. Furthermore, the first UE could release the first sidelink SRB if the sidelink MAC PDU including the second PC5-S message is received from the second UE.

In one embodiment, a first SCCH configuration specified in a RRC specification could be used for establishing the first sidelink SRB and the second sidelink SRB. Furthermore, a second SCCH configuration specified in a RRC specification could be used for establishing the third sidelink SRB.

In one embodiment, the default Destination Layer-2 ID could be associated with a sidelink service for which the unicast link or the PC5-RRC connection is established. The first PC5-S message could be a Direct Communication Request. The second PC5-S message could be a security related message (e.g. Direct Auth and Key Establish or Direct Security Mode Command).

In one embodiment, each sidelink SRB may correspond to a Sidelink Control Channel (SCCH).

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for unicast link establishment by a first User Equipment (UE), comprising:
    establishing a first sidelink Signaling Radio Bearer (SRB) for PC5-S message transmission, wherein the first sidelink SRB is associated with a default Destination Layer-2 Identity (ID);
    transmitting a first PC5-S message on the first sidelink SRB with a Source Layer-2 ID derived from a Layer-2 ID of the first UE and a Destination Layer-2 ID derived from the default Destination Layer-2 ID;
    receiving a second PC5-S message from a second UE, wherein the second PC5-S message is transmitted with a Source Layer-2 ID derived from a Layer-2 ID of the second UE and a Destination Layer-2 ID derived from the Layer-2 ID of the first UE; and
    establishing a second sidelink SRB for PC5-S message reception and/or transmission, wherein the second sidelink SRB is associated with the Layer-2 ID of the second UE.

2. The method of claim 1, further comprising establishing a third sidelink SRB for PC5-Radio Resource Control (PC5-RRC) message transmission in response to a unicast link or the PC5-RRC connection establishment being successfully completed, wherein the third sidelink SRB is associated with the Layer-2 ID of the second UE.

3. The method of claim 2, further comprising:
    establishing a fourth sidelink SRB for protected PC5-S message transmission, wherein the fourth sidelink SRB is associated with the Layer-2 ID of the second UE.

4. The method of claim 2, further comprising:
    not establishing any sidelink SRB for PC5-RRC message transmission before the unicast link or the PC5-RRC connection establishment has been successfully completed.

5. The method of claim 2, wherein a second Sidelink Control Channel (SCCH) configuration specified in a RRC specification is used for establishing the third sidelink SRB.

6. The method of claim 1, wherein the second sidelink SRB is established in response to reception of the second PC5-S message by a physical layer of the first UE.

7. The method of claim 1, wherein a first Sidelink Control Channel (SCCH) configuration specified in a Radio Resource Control (RRC) specification is used for establishing the first sidelink SRB and the second sidelink SRB.

8. The method of claim 1, wherein the default Destination Layer-2 ID is associated with a sidelink service for which a unicast link or a PC5-Radio Resource Control (PC5-RRC) connection is established.

9. The method of claim 1, wherein the first PC5-S message is a Direct Communication Request.

10. The method of claim 1, wherein the second PC5-S message is a security related message.

11. The method of claim 1, wherein each sidelink SRB corresponds to a Sidelink Control Channel (SCCH).

12. A first UE (User Equipment) for establishing unicast link, comprising:
    a processor; and
    a memory operatively coupled to the processor, wherein the processor is configured to execute a program code to:
        establish a first sidelink Signaling Radio Bearer (SRB) for PC5-S message transmission in response to a unicast link or a PCS-Radio Resource Control (PC5-RRC) connection establishment being initiated, wherein the first sidelink SRB is associated with a default Destination Layer-2 Identity (ID);

transmit a first PC5-S message for the unicast link or the PC5-RRC connection establishment on the first sidelink SRB with a Source Layer-2 ID derived from a Layer-2 ID of the first UE and a Destination Layer-2 ID derived from the default Destination Layer-2 ID;

receive a second PC5-S message from a second UE, wherein the second PC5-S message is transmitted with a Source Layer-2 ID derived from a Layer-2 ID of the second UE and a Destination Layer-2 ID derived from the Layer-2 ID of the first UE; and establish a second sidelink SRB for PC5-S message reception and/or transmission, wherein the second sidelink SRB is associated with the Layer-2 ID of the second UE.

13. The first UE of claim 12, wherein the processor is further configured to execute a program code to:

establish a third sidelink SRB for PC5-RRC message transmission in response to the unicast link or the PC5-RRC connection establishment being successfully completed, wherein the third sidelink SRB is associated with the Layer-2 ID of the second UE.

14. The first UE of claim 13, wherein the processor is further configured to execute a program code to:

establish a fourth sidelink SRB for protected PC5-S message transmission, wherein the fourth sidelink SRB is associated with the Layer-2 ID of the second UE.

15. The first UE of claim 13, wherein a second Sidelink Control Channel (SCCH) configuration specified in a RRC specification is used for establishing the third sidelink SRB.

16. The first UE of claim 12, wherein the processor is further configured to execute a program code to:

not establish any sidelink SRB for PC5-RRC message transmission before the unicast link or the PC5-RRC connection establishment has been successfully completed.

17. The first UE of claim 12, wherein the second sidelink SRB is established in response to reception of the second PC5-S message by a physical layer of the first UE.

18. The first UE of claim 12, wherein a first Sidelink Control Channel (SCCH) configuration specified in a RRC specification is used for establishing the first sidelink SRB and the second sidelink SRB.

19. The first UE of claim 12, wherein the first PC5-S message is a Direct Communication Request.

20. The first UE of claim 12, wherein the second PC5-S message is a security related message.

* * * * *